US012612473B2

(12) United States Patent
Song et al.

(10) Patent No.: US 12,612,473 B2
(45) Date of Patent: Apr. 28, 2026

(54) POLYETHYLENE AND ITS CHLORINATED POLYETHYLENE

(71) Applicant: LG Chem, Ltd., Seoul (KR)

(72) Inventors: Eun Kyoung Song, Daejeon (KR); Sun Mi Kim, Daejeon (KR); Si Jung Lee, Daejeon (KR); Bog Ki Hong, Daejeon (KR); Cheolhwan Jeong, Daejeon (KR); Daesik Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1229 days.

(21) Appl. No.: 17/599,263

(22) PCT Filed: Oct. 7, 2020

(86) PCT No.: PCT/KR2020/013627
§ 371 (c)(1),
(2) Date: Sep. 28, 2021

(87) PCT Pub. No.: WO2021/071226
PCT Pub. Date: Apr. 15, 2021

(65) Prior Publication Data

US 2022/0177614 A1 Jun. 9, 2022

(30) Foreign Application Priority Data

Oct. 7, 2019 (KR) ........................ 10-2019-0123775
Oct. 6, 2020 (KR) ........................ 10-2020-0128982

(51) Int. Cl.

| | |
|---|---|
| ***C08F 8/20*** | (2006.01) |
| ***C08F 4/659*** | (2006.01) |
| ***C08F 4/6592*** | (2006.01) |
| ***C08F 110/02*** | (2006.01) |
| ***C08L 23/286*** | (2025.01) |
| ***C08L 27/06*** | (2006.01) |

(52) U.S. Cl.
CPC ............ *C08F 8/20* (2013.01); *C08F 4/65904* (2013.01); *C08F 4/65925* (2013.01); *C08F 4/65927* (2013.01); *C08F 110/02* (2013.01); *C08L 23/286* (2013.01); *C08L 27/06* (2013.01)

(58) Field of Classification Search
CPC .... C08F 8/20; C08F 4/65904; C08F 4/65925; C08F 4/65927; C08F 110/02; C08F 8/22; C08F 4/65912; C08F 4/65916; C08F 2420/07; C08F 2420/09; C08L 23/286; C08L 27/06
See application file for complete search history.

(56) References Cited

U.S. PATENT DOCUMENTS

2004/0005424 A1* 1/2004 Krumpel ............. C08L 23/0815 428/36.9
2009/0035546 A1 2/2009 McLeod
2015/0065669 A1 3/2015 Hlavinka et al.
2016/0122448 A1* 5/2016 Buryak ............... C08L 23/0815 526/64
2017/0058063 A1 3/2017 Lhost et al.
2018/0194883 A1 7/2018 Kim et al.
2018/0282504 A1 10/2018 Tynys et al.
2019/0119420 A1 4/2019 Park et al.
2019/0169325 A1 6/2019 Lee et al.
2019/0284315 A1 9/2019 Rohatgi et al.
2020/0048383 A1* 2/2020 Hule ..................... C08F 210/16

FOREIGN PATENT DOCUMENTS

| | | | | |
|---|---|---|---|---|
| CN | 1466608 | A | 1/2004 | |
| CN | 104271616 | A | 1/2015 | |
| CN | 105658677 | A | 6/2016 | |
| CN | 107108994 | A | 8/2017 | |
| CN | 108401432 | A | 8/2018 | |
| CN | 109563198 | A | 4/2019 | |
| EP | 3109275 | A1 * | 12/2016 | ............ C08F 110/02 |
| JP | H06157855 | A | 6/1994 | |
| JP | 2004510023 | A | 4/2004 | |
| JP | 2010535273 | A | 11/2010 | |
| JP | 2016507601 | A | 3/2016 | |
| JP | 2016531985 | A | 10/2016 | |
| JP | 2017519946 | A | 7/2017 | |
| KR | 20120073947 | A | 7/2012 | |
| KR | 20140125726 | A | 10/2014 | |
| KR | 20160030981 | A | 3/2016 | |
| KR | 2016-0045434 | A | 4/2016 | |
| KR | 20160069462 | A | 6/2016 | |
| KR | 20180040998 | A | 4/2018 | |
| KR | 20180064115 | A | 6/2018 | |
| KR | 20180067944 | A | 6/2018 | |

(Continued)

OTHER PUBLICATIONS

Extended European Search Report including Written Opinion for Application No. 20873864.1 dated Jun. 28, 2022, pp. 1-7.
Search Report dated Sep. 16, 2022 from the Office Action for Chinese Application No. 202080023721.8 issued Oct. 9, 2022, 3 pages.
Alexakis et al, "Mild Protection and Deprotection of Alcohols as Ter-butyl Ethers in the Field of Pheromone Synthesis"; Tetrahedron Letters, vol. 29, No. 24, pp. 2951-2954, Year 1988.
International Search Report for Application No. PCT/KR2020/013627, dated Feb. 1, 2021, 3 pages.

*Primary Examiner* — Kumar R Bhushan
(74) *Attorney, Agent, or Firm* — Lerner David LLP

(57) ABSTRACT

The present disclosure relates to a polyethylene, which is reacted with chlorine to prepare a chlorinated polyethylene having excellent chlorination productivity and thermal stability by enabling an increase in chlorination temperature, and facilitating deoxidation, dehydration and drying processes during chlorination processing, by implementing an enlarged area of the middle and high molecular weight regions in the molecular structure of the polyethylene.

17 Claims, No Drawings

(56) References Cited

FOREIGN PATENT DOCUMENTS

| | | | | | |
|---|---|---|---|---|---|
| KR | 20200090622 | A | | 7/2020 | |
| WO | 2014095911 | A1 | | 6/2014 | |
| WO | 2014171772 | A1 | | 10/2014 | |
| WO | 2015051879 | A1 | | 4/2015 | |
| WO | 2015051880 | A1 | | 4/2015 | |
| WO | WO-2018075243 | A1 | * | 4/2018 | ............ C08F 210/16 |

* cited by examiner

POLYETHYLENE AND ITS CHLORINATED POLYETHYLENE

CROSS-REFERENCE TO RELATED APPLICATION(S)

The present application is a national stage entry under 35 U.S.C. § 371 of International Application No. PCT/KR2020/013627 filed on Oct. 7, 2020, which claims priority from Korean Patent Application No. 10-2019-0123775 filed on Oct. 7, 2019, and Korean Patent Application No. 10-2020-0128982 filed on Oct. 6, 2020, the disclosures of all of which are incorporated herein by reference.

TECHNICAL FIELD

The present invention relates to a polyethylene, which may prepare a chlorinated polyethylene having improved chlorination productivity by enabling an increase in chlorination temperature, and facilitating deoxidation, dehydration and drying processes during chlorination processing, by implementing an enlarged area of the middle and high molecular weight regions in the molecular structure of the polyethylene, and a chlorinated polyethylene thereof.

BACKGROUND

Chlorinated polyethylenes (CPE) prepared by reacting polyethylenes with chlorine are known to have better physical and mechanical properties than the polyethylene, and in particular, they can resist harsh external environments, and thus, can be used as a packing material such as various containers, fibers and pipes and a heat transfer material.

In general, chlorinated polyethylenes are prepared by making the polyethylene in suspension and then reacting with chlorine, or by placing the polyethylene in an aqueous HCl solution and then reacting with chlorine to replace hydrogen of the polyethylene with chlorine. Through the process of chlorination of polyethylene, chlorinated polyethylenes (CPE) takes on rubber-like properties.

In order to fully express properties of chlorinated polyethylene, chlorine must be uniformly substituted in polyethylene, which is affected by the properties of polyethylene reacting with chlorine. In particular, chlorinated polyethylenes such as CPE, etc. are widely used for electric wires and cables by compounding with inorganic additives and cross-linking agents, and strength of the chlorinated polyethylene compound varies depending on physical properties of the chlorinated polyethylene.

In addition, chlorinated polyethylene may generally be prepared by reacting polyethylene with chlorine in a suspension state, or by reacting polyethylene with chlorine in an aqueous HCl solution. In general, during the production of CPE, it goes through the processes of chlorination, deoxidation, dehydration, and drying. However, if the crystal structure of polyethylene is not maintained stably, the crystal structure is collapsed through a high-temperature chlorination reaction and the pores of the polyethylene particles may be blocked. Thereafter, in the post-deoxidation process, washing with water is required to remove residual HCl in the polyethylene particles. At that time, if the pores are blocked as such, the deoxidation time may be is delayed to cause the delay of the overall production time, thereby lowering the chloride productivity. Therefore, it is known that the productivity of CPE by CPE manufacturers is higher as the washing and drying time and efficiency in the chlorination step are better.

Accordingly, the optimized ranges of the physical properties are required in the chlorinated polyethylene in order to improve excellent strength and processability during extrusion when compounding for an application such as wires and cables. In addition, there is a continuous demand for developing a method for preparing a polyethylene having a molecular structure with an enlarged area in high and medium molecular weight ranges.

DETAILED DESCRIPTION OF THE INVENTION

Technical Problem

In the present disclosure, there is provided a polyethylene which may prepare a chlorinated polyethylene having excellent strength and improved processability during extrusion by implementing an enlarged area of the middle and high molecular weight regions in the molecular structure, and a method of preparing the polyethylene.

In addition, the present disclosure is to provide a chlorinated polyethylene prepared by reacting the polyethylene with chlorine, and a PVC composition including the chlorinated polyethylene.

Technical Solution

In an embodiment of the present disclosure, there is provided a polyethylene, wherein $MI_5$ (a melt index measured at 190° C. under a load of 5 kg) is 0.55 g/10 min or less, $MI_{21.6}$ (a melt index measured at 190° C. under a load of 21.6 kg) is 6 g/10 min or less, a complex viscosity ($\eta^*(\omega 0.05)$) is 68000 Pa·s or more, measured at a frequency ($\omega$) of 0.05 rad/s, and a complex viscosity ($\eta^*(\omega 500)$) is 900 Pa·s to 1600 Pa·s, measured at a frequency ($\omega$) of 500 rad/s.

In addition, the present disclosure provides a method for preparing the polyethylene.

The present disclosure also provides a chlorinated polyethylene prepared by reacting the polyethylene with chlorine.

The present disclosure also provides a PVC composition including the chlorinated polyethylene and polyvinyl chloride (PVC).

Advantageous Effects

A polyethylene according to the present disclosure is reacted with chlorine to prepare a chlorinated polyethylene excellent in chlorination productivity and thermal stability by implementing an enlarged area of the middle and high molecular weight regions in the molecular structure.

DETAILED DESCRIPTION OF THE EMBODIMENTS

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present disclosure will be described in more detail.

According to an embodiment of the present disclosure, there is provided a polyethylene capable of preparing chlorinated polyethylene having improved processability during extrusion with excellent strength by implementing a molecular structure having an enlarged area of the middle and high molecular weight regions.

The polyethylene is characterized in that $MI_5$ (a melt index measured at 190° C. under a load of 5 kg) is 0.55 g/10 min or less, $MI_{21.6}$ (a melt index measured at 190° C. under a load of 21.6 kg) is 6 g/10 min or less, a complex viscosity (η*(ω0.05)) is 68000 Pa·s or more, measured at a frequency (ω) of 0.05 rad/s, and a complex viscosity (η*(ω500)) is 900 Pa·s to 1600 Pa·s, measured at a frequency (ω) of 500 rad/s.

In general, chlorinated polyethylenes are produced by reacting polyethylenes with chlorine, which means that a part of hydrogen of the polyethylene is substituted with chlorine. When hydrogen of the polyethylene is substituted with chlorine, properties of the polyethylene are changed because atomic volumes of hydrogen and chlorine are different. For example, chlorination productivity and thermal stability are further increased. In particular, the smaller and uniform the overall size of the chlorinated polyethylene particles, the more easily the chlorine penetrates to the center of the polyethylene particles, so that the degree of chlorine substitution in the particles can be uniform, thereby exhibiting excellent physical properties. To this end, the polyethylene according to the present disclosure may provide a chlorinated polyethylene having an enlarged area of the medium and high molecular weight regions in the molecular structure, thereby exhibiting an excellent strength and improved processability during extrusion.

The polyethylene of the present invention has an enlarged area of the high and medium molecular weight region in its molecular structure, optimizing the melt index $MI_5$ (measured at 190° C., a load of 5 kg) and $MI_{21.6}$ (measured at 190° C., a load of 21.6 kg). It is characterized by maximizing the complex viscosity in the low-frequency region and maintaining the optimal range for the complex viscosity in the high-frequency region. As a result, it is possible to prepare a chlorinated polyethylene excellent in chlorination productivity, thermal stability, and mechanical properties, by increasing the area of the medium and high molecular weight regions in the molecular structure of polyethylene.

The polyethylene according to the present disclosure may be a high density polyethylene (HDPE), for example, an ethylene homopolymer.

As described above, the polyethylene has a melt index $MI_5$ of about 0.55 g/10 min or less, or about 0.1 g/10 min to about 0.55 g/10 min, measured under the conditions of a temperature of 190° C. and a load of 5 kg according to the method of American Society for Testing and Materials, ASTM D 1238. The melt index $MI_5$ of the polyethylene may be about 0.4 g/10 min or less, or about 0.1 g/10 min to about 0.4 g/10 min, or about 0.35 g/10 min or less, or about 0.21 g/10 min to about 0.35 g/10 min. In addition, together with the melt index $MI_5$ measured under the condition of 5 kg, the high load melt index $MI_{21.6}$ measured under the condition of 21.6 kg is about 6 g/10 min or less, or about 2.2 g/10 min to about 6 g/10 min. The melt index $MI_{21.6}$ of the polyethylene may be about 2.5 g/10 min to about 5.8 g/10 min, or about 5.5 g/10 min or less, or about 2.8 g/10 min to about 5.5 g/10 min. When either one of these melt indices $MI_5$ and $MI_{21.6}$ is too high, the content of low molecular weight region in the polyethylene increases. Then, the changes in the shape of the polyethylene particles increases, for example, the low molecular weight melts to form a lump at a high temperature during the chlorination process, resulting in poor thermal stability. Accordingly, the melt indices $MI_5$ and $MI_{21.6}$ should be about 0.55 g/10 min or less and about 6 g/10 min or less, respectively, in terms of implementing excellent thermal stability. On the other hand, the lower the melt indices $MI_5$ and $MI_{21.6}$, the higher the viscosity. Then, the physical properties such as the pattern viscosity when manufacturing chlorinated polyethylene may be out of the optimal range. In this case, a dispersion of inorganic substances may become poor. Accordingly, the melt indices $MI_5$ and $MI_{21.6}$ may be about 0.1 g/10 min or more and about 2.2 g/10 min or more, respectively, in terms of reducing the extrusion processing load during product processing and securing excellent physical properties.

In addition, the polyethylene of the present disclosure is preferable by optimizing the melt flow rate ratio ($MFRR_{21.6/5}$, ASTM D 1238, the melt index measured at 190° C. unde 21.6 kg load divided by the melt index measured at 190° C. under 5 kg load), together with the optimized melt indices $MI_5$ and $MI_{21.6}$. The melt flow rate ratio of the polyethylene ($MFRR_{21\ 6/5}$, ASTM D 1238, the melt index measured at 190° C. unde 21.6 kg load divided by the melt index measured at 190° C. under 5 kg load) is from about 10 to about 18. Specifically, the melt flow rate ratio may be from about 10 to about 16, or from about 12 to about 15.5, or from about 13.1 to about 15.2. The melt flow rate ratio may be about 10 or more in terms of processability during extrusion, and may be about 18 or less in terms of securing excellent mechanical properties by increasing the Mooney viscosity (MV) of CPE.

In particular, the polyethylene may be prepared by optimizing the input amount of hydrogen gas and its conditions with a specific metallocene catalyst as well as a process conditions as described below. Also, by optimizing the complex viscosity according to a specific frequency together with the melt index described above and by increasing the molecular domain, the polyethylene may be processed so that the deoxidation, dehydration and drying processes are facilitated during chlorination. As a result, a chlorination productivity can be increased by enabling an increase in chlorination temperature, thereby improving the strength of the final product, CPE compound.

In the polyethylene, a complex viscosity (η*(ω0.05)) measured at a frequency (ω) of 0.05 rad/s appears high as about 68000 Pas or more, or about 68000 Pas to about 180000 Pas. Specifically, the complex viscosity (η*(ω0.05)) measured at the frequency (ω) 0.05 rad/s may be about 70000 Pas or more, or about 70000 Pas to about 160000 Pas; or about 75000 Pas or more, or from about 75000 Pas to about 150000 Pas; or about 79000 Pas or more, from about 79000 Pas to about 115000 Pas. In addition, the polyethylene has the complex viscosity (η*(ω500)) measured at a frequency (ω) of 500 rad/s in an optimal range from about 900 Pas to about 1600 Pas. Specifically, the complex viscosity (η*(ω500) measured at a frequency (ω) of 500 rad/s may be from about 1000 Pas to about 1500 Pas, or about 1050 Pas to about 1480 Pas. Here, the complex viscosity (η*(ω0.05)) measured at the frequency (ω) 0.05 rad/s is about 68000 Pas or more in terms of improving the chlorination productivity of polyethylene. In addition, the complex viscosity (η*(ω500)) measured at the frequency (ω) 500 rad/s is optimized in the above range, in terms of ensuring that the processing load is properly maintained when the polyethylene is extruded for processing compound products after the chlorination process.

Specifically, the complex viscosity may be measured using a rotary rheometer, for example, a rotary rheometer ARES (Advanced Rheometric Expansion System, ARES G2) of TA instruments. The polyethylene sample may be subjected to a gap of 2.0 mm using parallel plates with a diameter of 25.0 mm at 190° C. For example, the complex viscosity may be measured in dynamic strain frequency sweep mode, at the strain of 5% and the frequency of 0.05 rad/s to 500 rad/s. Here, a total of 41 points may be measured by 10 points in each decade.

In general, a perfectly elastic material deforms in proportion to an elastic shear stress, which is called Hooke's law. Additionally, in the case of a pure viscous liquid, deformation occurs in proportion to a viscous shear stress, which is called Newton's law. In a perfectly elastic material, when elastic energy is accumulated and elastic shear stress is removed, deformation can be restored again. In a perfectly viscous material, since all energy is dissipated by deformation, the deformation is not recovered even when the viscous shear stress is removed. Further, the viscosity of the material itself does not change.

However, in the molten state, a polymer has a property intermediate between that of a perfectly elastic material and a viscous liquid, which is called viscoelasticity. That is, when a polymer receives a shear stress in a molten state, the deformation is not proportional to the shear stress, and the viscosity changes according to the shear stress, which is also called a non-Newtonian fluid. This property is due to the complexity of deformation due to shear stress due to the large molecular size and complex intermolecular structure of the polymer.

In particular, when manufacturing a molded article using a polymer, shear thinning is considered important among the properties of a non-Newtonian fluid. The shear fluidization phenomenon refers to a phenomenon in which the viscosity of the polymer decreases as the shear rate increases, and the molding method of the polymer is determined according to the shear fluidization characteristics. In particular, as in the present invention, when manufacturing large molded articles such as large-diameter pipes or composite pipes or molded articles that require high-speed polymer extrusion, considerable pressure must be applied to the molten polymer, so it is difficult to manufacture such molded articles if they do not exhibit shear fluidization properties. Fluidization properties are considered important.

Accordingly, in the present invention, shear fluidization properties are measured through complex viscosity (η* [Pa·s]) according to frequency (ω [rad/s]). In particular, by optimizing the complex viscosity at frequencies (frequency, ω) of 0.05 rad/s and 500 rad/s, excellent chloride productivity and excellent physical properties of the PVC composition can be realized. In addition, the range of physical properties, such as the fringe viscosity (MV) of chlorinated polyethylene, can be predicted through the complex viscosity at a frequency (ω) of 500 rad/s.

In particular, the polyethylene made with a molecular structure optimized by the complex viscosity according to a specific frequency along with the melt index according to the present invention can minimize the particle change due to high temperature during the chlorination process to increase the temperature to high temperature, thereby improving thermal stability. Also, it is possible to prevent agglomeration and agglomeration, and the distribution of chlorine is substituted evenly while particle change is minimized, thereby improving the tensile strength of the PVC composition.

Meanwhile, the polyethylene may have a density of about 0.947 g/cm$^3$ or more. Specifically, the density of the polyethylene is about 0.947 g/cm$^3$ or more, or about 0.947 g/cm$^3$ to about 0.954 g/cm$^3$, or about 0.948 g/cm$^3$ or more, or about 0.948 g/cm$^3$ to about 0.953 g/cm$^3$, or about 0.950 g/cm$^3$ or greater, or from about 0.950 g/cm$^3$ to about 0.951 g/cm$^3$. This means that the content of crystalline parts in the polymer structure of polyethylene is high and dense, and thus, it is difficult to change the crystal structure during the chlorination process. In particular, when the density of the polyethylene is less than about 0.947 g/cm$^3$, the crystallinity of the particles is lowered to lower the thermal stability, and the shape change of the particles during the chlorination process is increased to form a lump, and the chlorination productivity may be reduced.

The polyethylene may have a weight average molecular weight of about 150000 g/mol to about 250000 g/mol, or about 170000 g/mol to about 220000 g/mol, or about 180000 g/mol to about 210000 g/mol. This means that the molecular weight of polyethylene is high and the content of high molecular weight components is high, thereby preventing deterioration of thermal stability due to low molecular weight in the chlorination process as described above.

In addition, the molecular weight distribution of the polyethylene may be from about 2 to about 10, or from about 3 to about 8, or from about 4 to about 6. This means that the molecular weight distribution of polyethylene is narrow. If the molecular weight distribution is wide, since the molecular weight difference between polyethylenes is large, the chlorine content between polyethylenes may vary after the chlorination reaction, making it difficult to uniformly distribute chlorine. In addition, when the low molecular weight component is melted, since the fluidity is high, the pores of the polyethylene particles are blocked, thereby reducing the chlorination productivity. However, in the present invention, since the molecular weight distribution is as described above, the difference in molecular weight between polyethylenes after the chlorination reaction is not large, so that chlorine can be uniformly substituted.

As an example, the molecular weight distribution (MWD, polydispersity index) my be measured using the gel permeation chromatography (GPC, gel permeation chromatography, manufactured by Water) of the polyethylene weight average molecular weight (Mw) and the number average molecular weight (Mn). Then, it can be calculated by dividing the weight average molecular weight by the number average molecular weight. Here, the weight average molecular weight and the number average molecular weight may be measured using a polystyrene conversion method.

In particular, as a gel permeation chromatography (GPC) apparatus, a Waters PL-GPC220 instrument may be used, and a Polymer Laboratories PLgel MIX-B 300 mm long column may be used. Here, the measurement temperature is 160° C., 1,2,4-trichlorobenzene can be used as a solvent, and the flow rate can be applied at 1 mL/min. Each sample of the polyethylene is pretreated by dissolving it in trichlorobenzene (1,2,4-Trichlorobenzene) containing 0.0125% of BHT at 160° C. for 10 hours using a GPC analysis device (PL-GP220), and a concentration of 10 mg/10 mL. After preparation, it can be supplied in an amount of 200 μL. The values of Mw and Mn can be derived using a calibration curve formed using a polystyrene standard specimen. The weight average molecular weight of the polystyrene standard specimen may be 2000 g/mol, 10000 g/mol, 30000 g/mol, 70000 g/mol, 200000 g/mol, 700000 g/mol, 2000000 g/mol, 4000000 g/mol, 10000000 g Nine types of/mol.

According to another embodiment of the present disclosure, there is provided a method for preparing the polyethylene as described above.

The method for preparing the polyethylene according to the present disclosure comprises the step of polymerizing ethylene in the presence of at least one first metallocene compound represented by the following Chemical Formula 1; and at least one second metallocene compound selected from the compounds represented by the following Chemical Formula 2, wherein the molar ratio of the first metallocene compound and the second metallocene compound is 2.5:10 to 7:10.

[Chemical Formula 1]

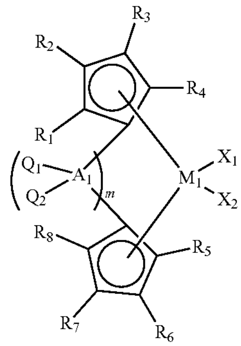

In Chemical Formula 1, at least one of $R_1$ to $R_8$ is $—(CH_2)_n—OR$, wherein R is $C_{1-6}$ linear or branched alkyl and n is an integer of 2 to 4;

the rest of $R_1$ to $R_8$ are the same as or different from each other, and are each independently selected from the group consisting of hydrogen, halogen, $C_{1-20}$ linear or branched alkyl, $C_{2-20}$ linear or branched alkenyl, $C_{6-20}$ aryl, $C_{7-40}$ alkylaryl, and $C_{7-40}$ arylalkyl, or two or more of $R_1$ to $R_4$ or two or more of $R_5$ to $R_8$ that are adjacent to each other are connected with each other to form a $C_{6-20}$ aliphatic or aromatic ring unsubstituted or substituted with a $C_{1-10}$ hydrocarbyl group;

$Q_1$ and $Q_2$ are the same as or different from each other, and are each independently hydrogen, halogen, $C_{1-20}$ linear or branched alkyl, $C_{2-20}$ linear or branched alkenyl, $C_{2-20}$ linear or branched alkoxyalkyl, $C_{6-20}$ aryl, $C_{7-40}$ alkylaryl, or $C_{7-40}$ arylalkyl;

$A_1$ is carbon, silicon, or germanium;

$M_1$ is a Group 4 transition metal;

$X_1$ and $X_2$ are the same as or different from each other, and are each independently halogen, $C_{1-20}$ linear or branched alkyl, $C_{2-20}$ linear or branched alkenyl, $C_{6-20}$ aryl, a nitro group, an amido group, $C_{1-20}$ alkylsilyl, $C_{1-20}$ linear or branched alkoxy, or a $C_{1-20}$ sulfonate group; and m is an integer of 0 or 1,

[Chemical Formula 2]

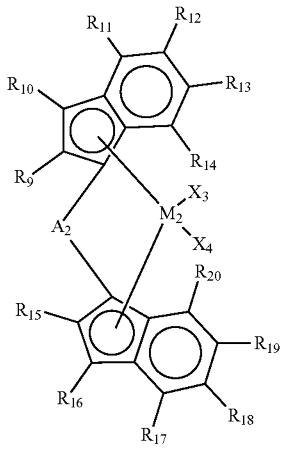

In Chemical Formula 2, $A_2$ is $C_{4-20}$ alkylene, $C_{4-20}$ alkenylene, $C_{6-20}$ arylene, $C_{4-20}$ cycloalkylene, $C_{7-22}$ arylalkylene, or $C_{5-22}$ cycloalkylalkylene;

$R_9$, $R_{10}$, $R_{15}$, and $R_{16}$ are the same as or different from each other, and are each independently hydrogen, halogen, $C_{1-20}$ linear or branched alkyl, $C_{2-20}$ linear or branched alkenyl, $C_{1-20}$ alkylsilyl, $C_{1-20}$ silylalkyl, $C_{1-20}$ alkoxysilyl, $C_{1-20}$ linear or branched alkoxy, $C_{6-20}$ aryl, $C_{7-40}$ alkylaryl, or $C_{7-40}$ arylalkyl;

$R_{11}$ to $R_{14}$ and $R_{17}$ to $R_{20}$ are the same as or different from each other, and are each independently hydrogen, halogen, $C_{1-20}$ linear or branched alkyl, $C_{2-20}$ linear or branched alkenyl, $C_{1-20}$ alkylsilyl, $C_{1-20}$ silylalkyl, $C_{1-20}$ alkoxysilyl, $C_{1-20}$ linear or branched alkoxy, $C_{6-20}$ aryl, $C_{7-40}$ alkylaryl, or $C_{7-40}$ arylalkyl, or two or more of $R_{11}$ to $R_{14}$ or two or more of $R_{17}$ to $R_{20}$ that are adjacent to each other are connected with each other to form a $C_{6-20}$ aliphatic or aromatic ring unsubstituted or substituted with a $C_{1-10}$ hydrocarbyl group;

$M_2$ is a Group 4 transition metal; and $X_3$ and $X_4$ are the same as or different from each other, and are each independently halogen, $C_{1-20}$ linear or branched alkyl, $C_{2-20}$ linear or branched alkenyl, $C_{6-20}$ aryl, a nitro group, an amido group, $C_{1-20}$ alkylsilyl, $C_{1-20}$ linear or branched alkoxy, or a $C_{1-20}$ sulfonate group.

Unless otherwise specified herein, following terms may be defined as follows.

The halogen may be fluorine (F), chlorine (Cl), bromine (Br), or iodine (I).

The $C_{1-20}$ alkyl may be linear, branched or cyclic alkyl. Specifically, the $C_{1-20}$ alkyl may be $C_{1-20}$ linear alkyl; $C_{1-15}$ linear alkyl; $C_{1-5}$ linear alkyl; $C_{3-20}$ branched or cyclic alkyl; $C_{4-20}$ branched or cyclic alkyl; or $C_{4-15}$ branched or cyclic alkyl; or $C_{4-10}$ branched or cyclic alkyl. More specifically, the $C_{1-20}$ alkyl may be methyl, ethyl, propyl, isopropyl, n-butyl, tert-butyl, pentyl, hexyl, heptyl, octyl, cyclopropyl, cyclobutyl, cyclopentyl, cyclohexyl, cycloheptyl, or cyclooctyl, and the like, but is not limited thereto.

The $C_{2-20}$ alkenyl may be linear, branched, or cyclic alkenyl. Specifically, it may be allyl, ethenyl, propenyl, butenyl, pentenyl, or hexenyl, and the like, but is not limited thereto.

The $C_{6-20}$ aryl may be a monocyclic, bicyclic or tricyclic aromatic hydrocarbon. For example, the $C_{6-20}$ aryl may be phenyl, biphenyl, naphthyl, anthracenyl, phenanthrenyl, or fluorenyl, and the like, but is not limited thereto.

The $C_{5-20}$ heteroaryl may be a monocyclic, bicyclic or tricyclic heteroaromatic hydrocarbon. For example, the $C_{5-20}$ heteroaryl may be carbazolyl, pyridyl, quinolinyl, isoquinolinyl, thiophenyl, furanyl, imidazolyl, oxazolyl, thiazolyl, triazinyl, tetrahydro pyranyl, or tetrahydrofuranyl, and the like, but is not limited thereto.

The $C_{1-20}$ alkoxy may be methoxy, ethoxy, isopropoxy, n-butoxy, tert-butoxy, pentoxy, or cyclohexyloxy, and the like, but is not limited thereto.

The $C_{1-20}$ alkylsilyl or the $C_{1-20}$ alkoxysilyl is a functional group in which 1 to 3 hydrogens of $—SiH_3$ are substituted with 1 to 3 of alkyl groups or alkoxy groups as described above. For example, the $C_{1-20}$ alkylsilyl or the $C_{1-20}$ alkoxysilyl may be alkylsilyl such as methylsilyl, dimethylsilyl, trimethylsilyl, dimethylethylsilyl, diethylmethylsilyl or dimethylpropylsilyl; alkoxysilyl such as methoxysilyl, dimethoxysilyl, trimethoxysilyl or dimethoxyethoxysilyl; or alkoxyalkylsilyl such as methoxydimethylsilyl, diethoxymethylsilyl or dimethoxypropylsilyl; and the like, but is not limited thereto.

The $C_{1-20}$ silylalkyl is a functional group in which at least one hydrogen of the alkyl as described above is substituted with silyl or alkylsilyl or alkoxysilyl. For example, the $C_{1-20}$ silylalkyl may be $—CH_2—SiH_3$, methylsilylmethyl or trimethylsilylmethyl, or dimethylethoxysilylpropyl, and the like, but is not limited thereto.

In addition, the $C_{1-20}$ alkylene is the same as the above-mentioned alkyl except that it is a divalent substituent. For example, the $C_{1-20}$ alkylene may be methylene, ethylene, propylene, butylene, pentylene, hexylene, heptylene, octylene, cyclopropylene, cyclobutylene, cyclopentylene, cyclohexylene, cycloheptylene, or cyclooctylene, and the like, but is not limited thereto.

The $C_{2-20}$ alkenylene is the same as the above-described alkenyl except that it is a divalent substituent. For example, the $C_{2-20}$ alkenylene may be allylene, ethenylene, propenylene, butenylene, or pentenylene, and the like, but is not limited thereto.

The $C_{6-20}$ arylene is the same as the above-described aryl except that it is a divalent substituent. For example, the $C_{6-20}$ arylene may be phenylene, biphenylene, naphthylene, anthracenylene, phenanthrenylene, or fluorenylene, and the like, but is not limited thereto.

The Group 4 transition metal may be titanium (Ti), zirconium (Zr), or hafnium (Hf), and the like, but the present disclosure is not limited thereto.

In particular, in Formula 1, $Q_1$ and $Q_2$ may be each independently $C_{1-3}$ alkyl. Preferably $Q_1$ and $Q_2$ may be the same as each other, and both $Q_1$ and $Q_2$ may be methyl.

In Formula 1, $X_1$ and $X_2$ may be each independently halogen, preferably chloro.

In Formula 1, $A_1$ may be silicon (Si).

In Formula 1, $M_1$ may be zirconium (Zr) or hafnium (Hf), preferably zirconium (Zr).

Specifically, in Formula 1, $R_3$ and $R_6$ may be the same as or different from each other, and may be each independently an unsubstituted $C_1$-6 alkyl or $C_{2-6}$ alkyl substituted with $C_{1-6}$ alkoxy. Preferably, at least one of $R_3$ and $R_6$ may be $C_{2-6}$ alkyl substituted with alkoxy. For example, $R_3$ and $R_6$ may be each independently methyl, n-butyl, n-pentyl, or tert-butoxy hexyl.

In Formula 1, $R_1$, $R_2$, $R_4$, $R_5$, $R_7$, and $R_8$ may be the same as or different from each other, and may be each independently hydrogen or $C_{1-3}$ alkyl, preferably hydrogen or methyl.

Meanwhile, the first metallocene compound may be represented by any one of the following Chemical Formulae 1-1 to 1-6.

[Chemical Formula 1-1]

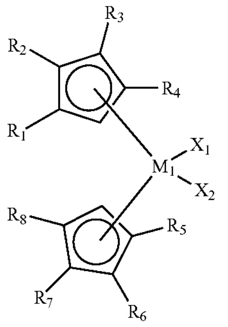

[Chemical Formula 1-2]

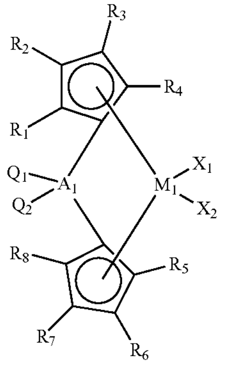

[Chemical Formula 1-3]

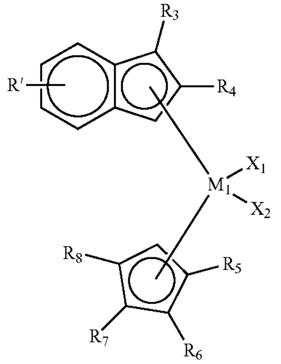

[Chemical Formula 1-4]

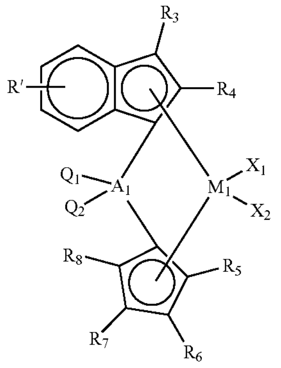

-continued

[Chemical Formula 1-5]

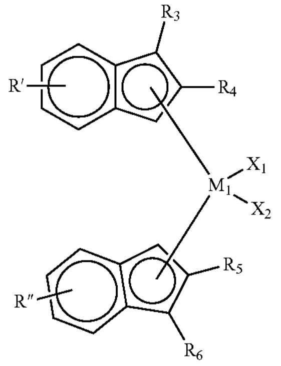

[Chemical Formula 1-6]

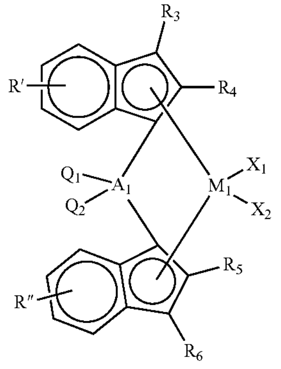

in Chemical Formulae 1-1 to 1-6, $Q_1$, $Q_2$, $A_1$, $M_1$, $X_1$, $X_2$, and $R_1$ to $R_8$ are the same as defined in Chemical Formula 1, and R' and R" are the same as or different from each other, and are each independently hydrogen or a $C_{1-10}$ hydrocarbyl group.

In Formulae 1-1 to 1-6, R' and R" may be hydrogen or $C_{1-6}$ alkyl, preferably hydrogen.

Meanwhile, the compound represented by Formula 1 may be, for example, a compound represented by one of the following structural formulas, but is not limited thereto.

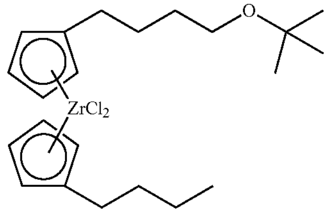

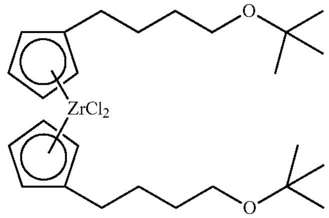

-continued

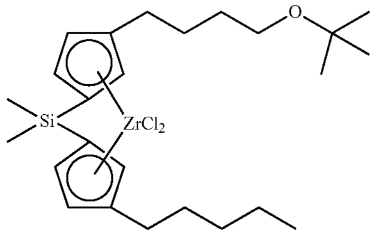

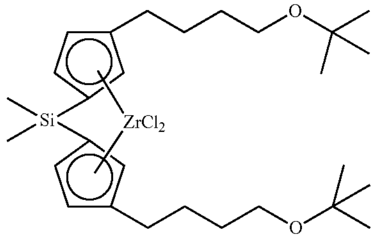

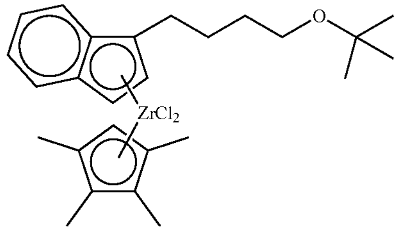

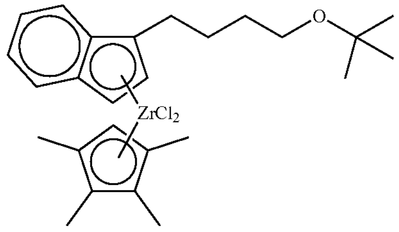

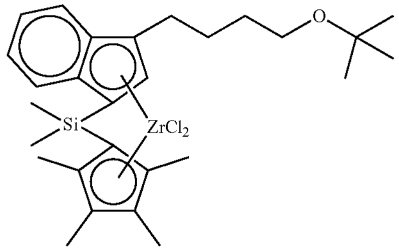

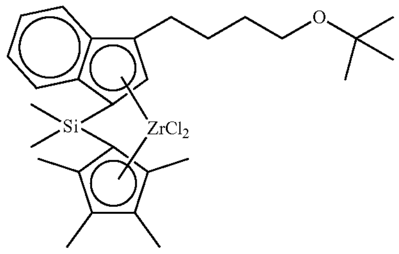

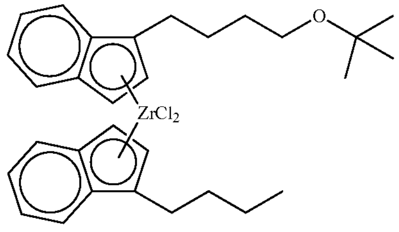

-continued

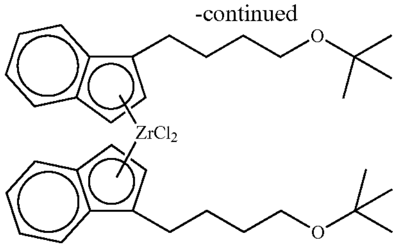

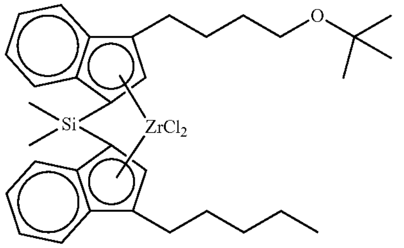

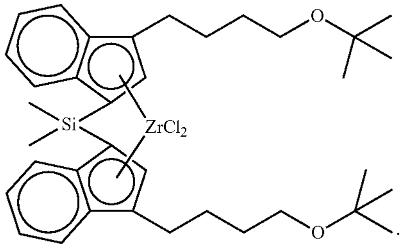

The first metallocene compound represented by Formula 1 or Formula 1-1, 1-2, 1-3, 1-4, 1-5, or 1-6 as described above may be prepared by a known method for synthesizing an organic compound, and a more detailed synthesis method may be referred to the following Examples.

Meanwhile, the method for preparing the polyethylene according to the present disclosure is characterized by using one or more of the first metallocene compounds represented by Chemical Formula 1 or Chemical Formula 1-1, 1-2, 1-3, 1-4, 1-5, or 1-6 as described aboves together with one or more second metallocene compounds to be described later. Therefore, the method for preparing the polyethylene according to the present disclosure can optimize the melt index and density of polyethylene, while maximizing the complex viscosity in the low frequency region as well as optimizing the complex viscosity in the high frequency region. Accordingly, it is possible to secure high productivity and excellent processability during extrusion in the CPE process to be described later.

According to another embodiment of the present disclosure, the second metallocene compound represented by Chemical Formula 2 has a characteristic of improving heat stability by increasing molecular entanglement, based on the enlarged content of the medium and high molecular weight regions in the molecular structure of the polyethylene. In particular, the second metallocene compound has the specific structure in which a transition metal coordinates between the two indene derivatives and $A_2$ having the specific structure connects the two indene derivatives. Accordingly, since the indene derivative having a relatively small steric hindrance has a structure connected through $A_2$ of the specific structure as described above, it is easy for a monomer such as ethylene, by using the second metallocene compound for the polymerization, to access the central metal of the transition metal compound, and to achieve the improved polymerization activity. In addition, since the second metallocene compound shows low hydrogen reactivity, it is possible to produce an olefin polymer having medium molecular weight without lowering the reaction activity, even when the melt index (MI) and melt flow rate ratio (MFRR) are adjusted by adding hydrogen.

Specifically, in Formula 2, $A_2$ may be $C_{6-20}$ arylene or $C_{6-12}$ arylene, or $C_{8-22}$ aryl dialkylene or $C_{8-14}$ aryl dialkylene. For example, $A_2$ may be phenylene, or naphthylene, or phenyl dimethylene or naphthyl dimethylene, phenyl diethylene or naphthyl diethylene, preferably phenylene or naphthyl dimethylene.

In Formula 2, $X_3$ and $X_4$ may each be halogen, and more specifically, chloro.

In Formula 2, $M_2$ may be zirconium (Zr) or hafnium (Hf), preferably zirconium (Zr).

In Formula 2, $R_9$ and $R_{15}$ may be each independently hydrogen, halogen, or $C_{1-20}$ linear or branched alkyl. Specifically, $R_9$ and $R_{15}$ may be each independently hydrogen, or $C_{1-6}$ linear or branched alkyl. More specifically, $R_9$ and $R_{15}$ are the same as each other, and may preferably be hydrogen.

In particular, $R_{10}$ to $R_{16}$ may be each independently $C_{1-20}$ alkylsilyl or $C_{1-20}$ silylalkyl, or each may be $C_{1-6}$ alkylsilyl or $C_{1-6}$ silylalkyl. Specifically, $R_{10}$ to $R_{16}$ may be the same as each other, preferably trimethylsilylmethyl.

In Formula 2, $R_{11}$ to $R_{14}$ and $R_{17}$ to $R_{20}$ may be each independently hydrogen, halogen, $C_{1-20}$ linear or branched alkyl. Specifically, $R_{11}$ to $R_{14}$, and $R_{17}$ to $R_{20}$ may be each independently hydrogen, halogen, $C_{1-12}$ or $C_{1-6}$ linear or branched alkyl. Alternatively, two or more of $R_{11}$ to $R_{14}$ or two or more of $R_{17}$ to $R_{20}$ that are adjacent to each other may be connected with each other to form a $C_{6-20}$ aliphatic or aromatic ring unsubstituted or substituted with a $C_{1-10}$ hydrocarbyl group. More specifically, $R_{11}$ to $R_{14}$, and $R_{17}$ to $R_{20}$ may be the same as each other, and preferably hydrogen.

Meanwhile, the second metallocene compound may be represented by the following Chemical Formulae 2-1 or 2-2.

[Chemical Formula 2-1]

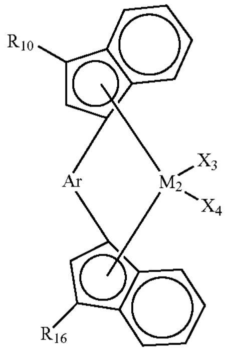

[Chemical Formula 2-2]

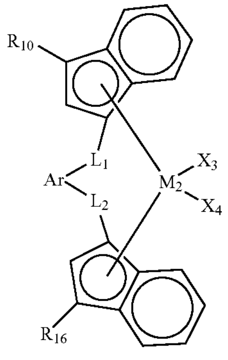

in Chemical Formulae 2-1 and 2-2, $M_2$, $X_3$, $X_4$, $R_{10}$, and $R_{16}$ are the same as defined in Chemical Formula 2, Ar are the same as or different from each other, and are each independently $C_{6-20}$ arylene, and $L_1$ and $L_2$ are the same as or different from each other, and are each independently $C_{1-4}$ alkylene.

Specifically, in Formulas 2-1 and 2-2, Ar may be each independently $C_{6-12}$ arylene, and more specifically, phenylene or naphthylene.

In Formulas 2-1 and 2-2, $L_1$ and $L_2$ may be each independently $C_{1-2}$ alkylene. In particular, $L_1$ and $L_2$ are the same as each other, and may be methylene or ethylene, preferably methylene.

Meanwhile, the second metallocene compound represented by Formula 2 may be, for example, a compound represented by the following structural formula, but is not limited thereto.

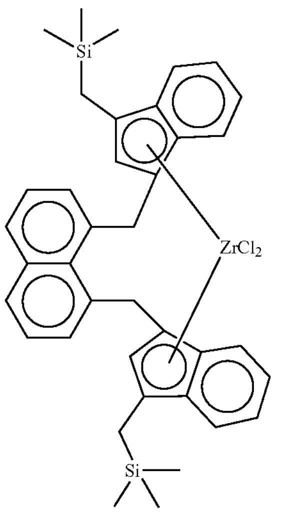

The metallocene compound represented by Chemical Formula 2 or by Chemical Formulae 2-1 or 2-2 as described above may be prepared by a known method for synthesizing an organic compound, and a more detailed synthesis method may be referred to the following Examples.

In the present disclosure, the equivalent (eq) refers to a molar equivalent (eq/mol).

The polyethylene according to the present disclosure may be prepared by homopolymerizing ethylene in the presence of at least one first metallocene compound represented by the Chemical Formula 1; and at least one second metallocene compound selected from the compounds represented by the Chemical Formula 2.

In particular, the molar ratio of the first metallocene compound and the second metallocene compound (first metallocene compound:second metallocene compound) may be about 2.5:10 to about 7:10, specifically, about 3:10 to about 6:10, or about 4:10 to about 5:10. The molar ratio of the catalyst precursors may be within the above range, in terms of increasing the content of medium or high molecular weight ranges and minimizing the content of the low molecular weight range in the molecular structure of the polyethylene to produce a chlorinated polyethylene in excellent chlorination productivity and thermal stability. In particular, when the molar ratio of the first metallocene compound and the second metallocene compound is within the above range, the amount of hydrogen input may be carried out in about 35 ppm to about 200 ppm based on the amount of ethylene input during the polymerization process, so that a wax content may be kept as low as 10% or less. The wax content may be measured by separating the polymerization product using a centrifugal separator, sampling 100 mL of the remaining hexane solvent, settling for 2 hours, and determining a volume ratio occupied by the wax.

Meanwhile, in the metallocene catalyst used for preparing the polyethylene in the present disclosure, the first metallocene compound and the second metallocene compound as described above may be supported on a support, and in some cases, a support together with a cocatalyst compound.

In the supported metallocene catalyst according to the present disclosure, the cocatalyst supported on a support for activating the metallocene compound is an organometallic compound containing a Group 13 metal and is not particularly limited as long as it can be used in the polymerization of olefins in the presence of a general metallocene catalyst.

The cocatalyst is an organometallic compound containing a Group 13 metal and is not particularly limited as long as it can be used in the polymerization of ethylene in the presence of a general metallocene catalyst.

Specifically, the cocatalyst may be at least one selected from the group consisting of the compounds represented by the following Chemical Formulae 3 to 5:

$$-[Al(R_{31})-O]_c- \qquad \text{[Chemical Formula 3]}$$

in Chemical Formula 3, $R_{31}$ are each independently halogen, $C_{1-20}$ alkyl, or $C_{1-20}$ haloalkyl, and c is an integer of 2 or more;

$$D(R_{41})_3 \qquad \text{[Chemical Formula 4]}$$

in Chemical Formula 4,

D is aluminum or boron, and $R_{41}$ are each independently hydrogen, halogen, $C_{1-20}$ hydrocarbyl or $C_{1-20}$ hydrocarbyl substituted with halogen, $$[L\text{-}H]^+[Q(E)_4]^- \text{ or } [L]^+[Q(E)_4]^- \qquad \text{[Chemical Formula 5]}$$

in Chemical Formula 5,

L is a neutral or cationic Lewis base;

$[L\text{-}H]^+$ is a bronsted acid,

Q is $B^{3+}$ or $Al^{3+}$, and

E are each independently $C_{6-20}$ aryl or $C_{1-20}$ alkyl unsubstituted or substituted with a substituent selected from the group consisting of halogen, C1-20 alkyl, C1-20 alkoxy, and phenoxy.

The compound represented by Chemical Formula 3 may be alkylaluminoxane such as modified methyl aluminoxane (MMAO), methyl aluminoxane (MAO), ethylaluminoxane, isobutylaluminoxane, butylaluminoxane, and the like.

The alkyl metal compound represented by Chemical Formula 4 may be trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, triisopropylaluminum, tri-s-butylaluminum, tricyclopentylaluminum, tripentylaluminum, triisopentylaluminum, trihexylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, or the like.

The compound represented by Chemical Formula 5 may be triethylammonium tetraphenylboron, tributylammonium tetraphenylboron, trimethylammonium tetraphenylboron, tripropylammonium tetraphenylboron, trimethylammonium tetra(p-tolyl)boron, tripropylammonium tetra(p-tolyl)boron, triethylammonium tetra(o,p-dimethylphenyl)boron, trimethylammonium tetra(o, p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trim ethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o, p-dimethylphenyl)aluminum, tributylammonium tetra(p-trifluoromethylphenyl)aluminum, trimethylammonium tetra (p-trifluoromethylphenyl)aluminum, tributylammonium tetrapentafluorophenylaluminum, N, N-diethylanilinium tetraphenylaluminum, N, N-diethylanilinium tetrapentafluorophenylaluminum, diethylammonium tetrapentafluorophenylaluminum, triphenylphosphonium tetraphenylaluminum, trimethylphosphonium tetraphenylaluminum, triphenylcarbonium tetraphenylboron, triphenylcarbonium tetraphenylaluminum, triphenylcarbonium tetra(p-trifluoromethylphenyl)boron, triphenylcarbonium tetrapentafluorophenylboron, or the like.

The cocatalyst may be supported in an amount of 5 mmol to 20 mmol based on 1 g of the support.

In the supported metallocene catalyst according to the present disclosure, a support containing hydroxyl groups on the surface may be used. Preferably, a support containing highly reactive hydroxyl groups and siloxane groups which is dried to remove moisture on the surface may be used.

As an example, the support may be silica, silica-alumina, or silica-magnesia dried at a high temperature, and commonly contain oxide, carbonate, sulfate, and nitrate such as $Na_2O$, $K_2CO_3$, $BaSO_4$, $Mg(NO_3)_2$, and the like.

A drying temperature of the support may preferably be about 200° C. to about 800° C., more preferably about 300° C. to about 600° C., and most preferably about 300° C. to about 400° C. When the drying temperature of the support is less than about about 200° C., surface moisture may react with the cocatalyst due to excessive moisture. When it is greater than about about 800° C., pores on the surface of the support may be combined to reduce the surface area, and a lot of hydroxyl groups may be lost on the surface and only siloxane groups may remain, thus decreasing the reaction sites with the cocatalyst, which is not preferable.

The amount of the hydroxyl groups on the surface of the support may preferably be about 0.1 mmol/g to about 10 mmol/g, more preferably about 0.5 mmol/g to about 5 mmol/g. The amount of the hydroxyl groups on the surface of the support may be controlled by the preparation method and conditions of the support, or drying conditions, for example, temperature, time, vacuum, spray drying, or the like.

When the amount of the hydroxyl groups is less than 0.1 mmol/g, the reaction sites with the cocatalyst may be little, and when it is greater than 10 mmol/g, there is a possibility of being derived from moisture other than hydroxyl groups on the surface of the support particle, which is not preferable.

In the supported metallocene catalyst of the present disclosure, a weight ratio of total transition metal included in the metallocene catalyst to the support may be 1:10 to 1:1000. When the support and the metallocene compounds are included within the above weight ratio, an optimal shape may be exhibited. In addition, a weight ratio of the cocatalyst compound to the support may be 1:1 to 1:100.

The ethylene polymerization reaction may be carried out using a continuous slurry polymerization reactor, a loop slurry reactor, a gas phase reactor, or a solution reactor.

In particular, the polyethylene according to the present disclosure may be prepared by homopolymerizing ethylene in the presence of at least one first metallocene compound represented by the Chemical Formula 1; and at least one second metallocene compound selected from the compounds represented by the Chemical Formula 2.

The polymerization may be performed at a temperature of about 25° C. to about 500° C., preferably about 25° C. to about 200° C., more preferably about 50° C. to about 150° C. In addition, the polymerization may be performed at a pressure of about 1 $kgf/cm^2$ to about 100 $kgf/cm^2$, preferably about 1 $kgf/cm^2$ to about 50 $kgf/cm^2$, more preferably about 5 $kgf/cm^2$ to about 30 $kgf/cm^2$.

In addition, the polymerization reaction may be carried out under conditions of introduction of hydrogen gas.

The hydrogen gas activates the inactive site of the metallocene catalyst and causes a chain transfer reaction to control the molecular weight. In particular, the metallocene compound of the present disclosure as described above has excellent hydrogen reactivity. Therefore, the polyethylene with a desired level of melt index, density, and complex viscosity range according to the present disclosure can be effectively obtained in the presence of the metallocene compound by controlling the amount of hydrogen gas used during the polymerization process.

The hydrogen gas may be introduced in an amount of about 35 ppm to about 200 ppm, or about 40 ppm to about 180 ppm, or about 50 ppm to about 150 ppm, based on the total weight of ethylene. By controlling the input amount of hydrogen gas used within the above range, physical properties of the obtained polyethylene, for example, the melt index, density, or complex viscosity, and the like, can be adjusted to the desired range, while exhibiting sufficient catalytic activity. Therefore, a polyethylene having appropriate physical properties according to the application can be produced effectively. In particular, when the input amount of hydrogen gas is less than about 35 ppm based on the total weight of ethylene, in the catalyst system using the first and the second metallocene compounds as described above, the melt index MI is lowered and complex viscosity increases, as the physical property of the polyethylene. As a result, after the chlorination process, the mooney viscosity (MV) of the chlorinated polyethylene may increase so that a large processing load is taken during the subsequent compounding process. Thus, a phenomenon that the surface is not smooth may appear in the final product. On the other hand, when the input amount of hydrogen gas exceeds about 200 ppm based on the total weight of ethylene, the content of low molecular weight region in the molecular structure of the polyethylene increases and the complex viscosity of the polyethylene is lowered. As a result, the change of particle shape during chlorination may be increased to decrease productivity. In addition, crosslinking degree may decrease, resulting in a decrease in tensile strength.

Meanwhile, in the polymerization process, the supported metallocene catalyst may be injected after being dissolved or diluted in a $C_5$ to $C_{12}$ aliphatic hydrocarbon solvent, such as pentane, hexane, heptane, nonane, decane and an isomer thereof; or in an aromatic hydrocarbon solvent, such as toluene and benzene; or in a hydrocarbon solvent substituted with chlorine, such as dichloromethane and chlorobenzene. The solvent used herein is preferably used after removing a small amount of water or air, which acts as a catalyst poison, by treating with a small amount of alkyl aluminum. It is also possible to further use the cocatalyst.

According to another embodiment of the present disclosure, a chlorinated polyethylene (CPE) using the above-described polyethylene is provided.

The chlorinated polyethylene according to the present disclosure may be prepared by polymerizing ethylene in the presence of the supported metallocene catalyst described above, and then reacting the polyethylene with chlorine.

The reaction with chlorine may be carried out by dispersing the prepared polyethylene with water, an emulsifier and a dispersant, and then adding a catalyst and chlorine to react.

As the emulsifier, polyether or polyalkylene oxide may be used. The dispersant may be a polymer salt or an organic acid polymer salt, and the organic acid may be methacrylic acid or acrylic acid.

The catalyst may be a chlorination catalyst used in the art, and benzoyl peroxide may be used. The chlorine may be used alone, or may be mixed with an inert gas and then used.

The chlorination reaction may be performed at about 60° C. to about 150° C., about 70° C. to about 145° C., or about 80° C. to about 140° C. for about 10 minutes to about 10 hours, about 1 hour to about 9 hours, or about 2 hours to about 8 hours.

The chlorinated polyethylene prepared by the above reaction may be further subjected to a neutralization process, a washing process and/or a drying process, and thus may be obtained in a powder form.

The chlorinated polyethylene exhibits an improved the stability to heat during chlorination because the polyethylene increases the content of the high molecular weight region and minimizes the content of the low molecular weight region in the molecular structure. For example, the chlorinated polyethylene is prepared by reacting the polyethylene with chlorine in a slurry (water or HCl aqueous solution) at about 60° C. to about 150° C., and may have a mooney viscosity (MV) measured at 121° C. of about 70 or more to about 120 or less, about 80 or more to about 110 or less, or about 90 or more to about 100 or less. Here, the unit for mooney viscosity is a Mooney Unit (MU), and the unit for mooney viscosity is not usually indicated. However, if conversion is required, one Mooney Unit (MU) may be 0.083 Nm.

In particular, when the mooney viscosity of the chlorinated polyethylene is less than about 60, the tensile strength of wires and cables manufactured with the chlorinated polyethylene compound may be too lowered. Further, when the Mooney viscosity of the chlorinated polyethylene is too high exceeding about 85, the surface of CPE compound processed for use in wires and cables by compounding with inorganic additives and cross-linking agents as described later may not be smooth and may be rough, and the gloss may be poor, resulting in a poor appearance.

Specifically, the Mooney viscosity (MV) may be values measured for the chlorinated polyethylene obtained by heating about 500 kg to about 600 kg of polyethylene in a slurry state (water or aqueous HCl solution) from about 75° C. to about 85° C. to a final temperature of about 120° C. to about 140° C. at a rate of about 15° C./hr to about 18.5° C./hr, and then performing a chlorination reaction with gaseous chlorine at a final temperature of about 120° C. to about 140° C. for about 2 hours to about 5 hours. At this time, the chlorination reaction may be carried out by injecting the gaseous chlorine while raising the temperature and maintaining the pressure in the reactor at about 0.2 MPa to about 0.4 MPa at the same time, and a total input amount of chlorine may be about 650 kg to about 750 kg.

Methods of measuring Mooney viscosity (MV), tensile strength, and tensile elongation of the chlorinated polyethylene are as described in Test Example 2 to be described later, and detailed measurement methods are omitted.

For example, the chlorinated polyethylene may have a chlorine content of about 20% by weight to about 50% by weight, about 31% by weight to about 45% by weight, or about 35% by weight to about 40% by weight. Here, the chlorine content of the chlorinated polyethylene may be measured using combustion ion chromatography (Combustion IC, Ion Chromatography). For example, the combustion ion chromatography uses a combustion IC (ICS-5000/AQF-2100H) device equipped with an IonPac AS18 (4×250 mm) column. The chlorine content may be measured using KOH (30.5 mM) as an eluent at a flow rate of 1 mL/min at an inlet temperature of 900° C. and an outlet temperature of 1000° C. The device conditions and measurement conditions for measuring the chlorine content are as described in Test Example 2 to be described later, the detailed description is omitted.

Specifically, the chlorinated polyethylene according to the present disclosure may have a Mooney viscosity (MV) of about 90 to about 100 under a condition where the chlorine content is 35% by weight to 40% by weight.

The chlorinated polyethylene may be, for example, a randomly chlorinated polyethylene.

The chlorinated polyethylene prepared according to the present invention is excellent in chemical resistance, weather resistance, flame retardancy, processability, or impact strength reinforcement effect, and the like, and thus is widely used as an impact modifier for PVC pipes and window profiles.

According to another embodiment of the present disclosure, there is provided a PVC composition including the above-described chlorinated polyethylene and polyvinyl chloride (PVC).

The PVC composition may include, for example, about 5 wt % to about 20 wt % of the chlorinated polyethylene and about 50 wt % to about 95 wt % of polyvinyl chloride (PVC).

For example, the chlorinated polyethylene may be included in about 5 wt % to about 20 wt %, or about 5 wt % to about 10 wt %.

The polyvinyl chloride may be included in about 50 wt % to about 95 wt %, or about 60 wt % to about 90 wt %.

For example, the PVC composition may further include about 5 parts by weight to about 600 parts by weight, or about 10 parts by weight to about 200 parts by weight of inorganic additives such as $TiO_2$, $CaCO_3$, and composite stearate (Ca, Zn-stearate) based on 100 parts by weight of the chlorinated polyethylene.

In a specific example, the PVC composition may include about 5 wt % to about 20 wt % of the chlorinated polyethylene, about 60 wt % to about 90 wt % of polyvinyl chloride (PVC), about 1 wt % to about 10 wt % of $TiO_2$, about 1 wt % to about 10 wt % of $CaCO_3$ and about 1 wt % to about 10 wt % of composite stearate (Ca, Zn-stearate).

The PVC composition may have a plasticization time of about 170 seconds or less, about 150 seconds or less, or about 150 seconds to 100 seconds. In addition, the PVC composition may have a Charpy impact strength measured at room temperature in accordance with ASTM E 23 of 24 $kJ/m^2$ or more, when compounded with polyvinyl chloride (PVC) at 160° C. to 190° C. Within this range, a balance of physical properties and productivity are excellent. A method for measuring the Charpy impact strength of the PVC composition is as described in Test Example 3 to be described later, and the detailed description is omitted.

In addition, the chlorinated polyethylene according to the present disclosure may produce a molded product by conventional methods in the art. For example, the molded product may be manufactured by roll-milling the chlorinated polyethylene and extruding it.

Hereinafter, preferred examples are provided to aid in understanding the present invention. However, these examples are for illustrative purposes only, and the invention is not intended to be limited by these examples.

Preparation of Catalyst Precursor

Synthesis Example 1: Preparation of the First Metallocene Compound

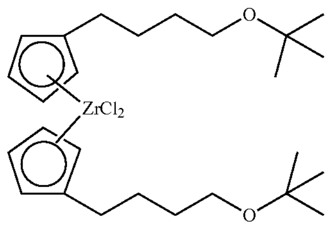

1-1 Preparation of Ligand Compound

After adding 10.8 g (100 mmol) of chlorobutanol to a dried 250 mL Schlenk flask, 10 g of a molecular sieve and 100 mL of methyl tert-butyl ether (MTBE) was added, and then 20 g of sulfuric acid was slowly added over 30 minutes. The reaction mixture slowly turned pink over time. After 16 hours, it was poured into ice-cold saturated sodium bicarbonate solution. To this mixture, diethyl ether (Ether, 100 mL×4) was added and extracted several times. The combined organic layer was dried over $MgSO_4$, filtered, and the solvent was removed under reduced pressure (vacuum). Then, 10 g of 1-(tert butoxy)-4-chlorobutane was obtained in the form of a yellow liquid (60% yield).

$^1$H NMR (500 MHz, $CDCl_3$, ppm): δ 1.16 (9H, s), 1.67-1.76 (2H, m), 1.86-1.90 (2H, m), 1.94 (1H, m), 3.36 (2H, m), 3.44 (1H, m), 3.57 (3H, m).

In a dried 250 mL shrink flask, 4.5 g (25 mmol) of 1-(tertery-butoxy)-4-chlorobutane synthesized above was added and dissolved in 40 mL of tetrahydrofuran (THF). Then, 20 mL of the THF solution of sodium cyclopentadienylide was slowly added thereto, followed by stirring for one day. The reaction mixture was quenched by adding 50 mL of water, extracted with diethyl ether (Ether, 50 mL×3), and then the combined organic layers were sufficiently washed with brine. After drying the remaining moisture with $MgSO_4$, filtering, and then removing the solvent under reduced pressure (vacuum), 2-(4-(tert-butoxy)butyl)cyclopenta-1,3-diene as a dark brown viscous product was obtained in a yield corresponding to an equivalent amount.

$^1$H NMR (500 MHz, $CDCl_3$, ppm): δ 1.16 (9H, s), 1.54-1.60 (4H, m), 1.65 (1H, m), 1.82 (1H, m), 2.37-2.42 (2H, m), 2.87, 2.92 (2H, s), 3.36 (2H, m), 5.99 (0.5H, s), 6.17 (0.5H, s), 6.25 (0.5H, s), 6.34 (0.5H, s), 6.42 (1H, s).

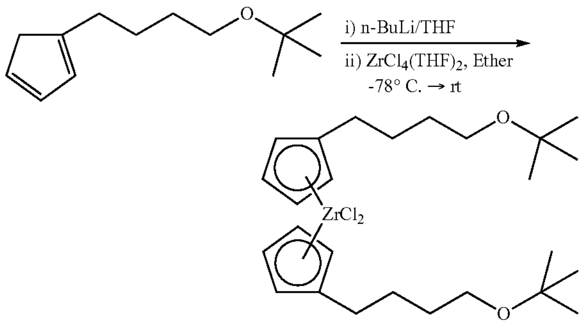

1-2 Preparation of Transition Metal Compound

In a dried 250 mL shrink flask, 4.3 g (23 mmol) of the ligand compound synthesized in 1-1 was placed and dissolved in 60 mL of tetrahydrofuran (THF). Thereafter, 11 mL of n-butyllithium (n-BuLi, 2.0 M hexane solution, 28 mmol) was added thereto, and the mixture was stirred for one day. Then, the solution prepared above was added slowly at −78° C. (Celsius degree) into the flask, in which 3.83 g (10.3 mmol) of $ZrCl4(THF)_2$ was dispersed with 50 mL of diethyl ether (Ether).

When the reaction mixture was raised to room temperature (rt, 25° C.), it changed from a pale brown suspension to a turbid yellow suspension. After stirring for one day, all the solvents of the reaction mixture were dried, 200 mL of hexane was added, and sonication was performed so that the hexane solution floating on the upper layer was decanted with a cannula. Then, the combined hexane solution obtained by repeating the above process twice was dried under reduced pressure (vacuum) to obtain bis(3-(4-(tertiary-butoxy)butyl-2,4-dienyl)zirconium(IV) in the form of a pale yellow solid.

$^1$H NMR (500 MHz, $CDCl_3$, ppm): δ 0.84 (6H, m), 1.14 (18H, s), 1.55-1.61 (8H, m), 2.61 (4H, m), 3.38 (4H, m), 6.22 (3H, s), 6.28 (3H, s).

Synthesis Example 2: Preparation of the First Metallocene Compound

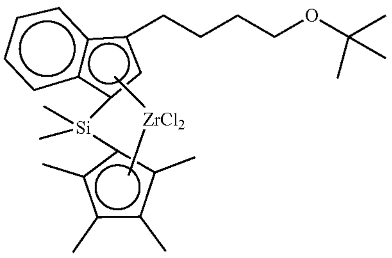

2-1 Preparation of Ligand Compound

In a dried 250 mL shrink flask, 6.0 mL (40 mmol) of tetramethylcyclopentadiene (TMCP) was dissolved in THF (60 mL), and cooled to −78° C. Then, after 17 mL of n-BuLi (42 mmol, 2.5 M hexane solution) was added dropwise thereto, the reaction mixture was raised to room temperature and stirred at room temperature overnight. In a separate 250 mL shrink flask, 4.8 mL of dichlorodimethylsilane (40 mmol) was dissolved in n-hexane, and cooled to −78° C., followed by slowly injecting the TMCP-lithiation solution prepared above thereto. Thereafter, the reaction mixture was stirred at room temperature overnight, and the solvent was removed under reduced pressure (vacuum). The product obtained from the reaction was dissolved in toluene and filtered for to remove the remaining LiCl. Therefore, 7.0 g (33 mmol) of chloromethyl(tetramethylcyclopentadienyl) silane (CDMTS) was obtained in the form of a yellow liquid (yield 83%).

$^1H$ NMR (500 MHz, $CDCl_3$, ppm): δ 0.24 (6H, s), 1.82 (6H, s), 1.98 (6H, s), 3.08 (1H, s).

In a dried 250 mL shrink flask, 2.72 g of 3-(6-(tert-butoxy)hexyl)-1H-indene (T-Ind, 10 mmol) was dissolved in 50 mL of THF. Then, 8.2 mL of n-BuLi (20.4 mmol, 2.5 M hexane solution) was added dropwise thereto, in the condition of a dryice/acetone bath. Then, a red solution was obtained after the reaction mixture was stirred overnight at room temperature. In a separate 250 mL shrink flask, 2.15 g of chloromethyl(tetramethylcyclopentadienyl)silane (CDMTS, 10 mmol) synthesized previously was dissolved in THF, and then the [3-(6-(tert-butoxy)hexyl)-1H-indene]-lithiation solution, (T-Ind)-lithiation solution (T-Ind-Li solution) was added dropwise thereto, in the condition of a dryice/acetone bath. Further, a dark brown slurry was obtained after the reaction mixture was stirred overnight at room temperature. After quenching with water and extraction with diethyl ether, 4.18 g (9.27 mmol) of the ligand compound was obtained (yield 92.7%).

$^1H$ NMR (500 MHz, $CDCl_3$, ppm): δ 0.43 (3H, s), −0.15 (3H, s), 1.21 (9H, s), 1.42-2.08 (22H, m), 2.61 (1H, s), 3.35-3.38 (2H, m), 3.52 (1H, s), 6.21 (1H, s), 7.17-7.43 (4H, m).

2-2 Preparation of Metallocene Compound 4.18 g (9.27 mmol) of the ligand compound synthesized in 2-1 was dissolved in 100 mL of toluene, followed by adding 4.4 mL (4 equivalents) of MTBE to prepare a reactant solution. Then, 8.2 mL of n-BuLi (20.4 mmol, 2.5M hexane solution) was added to the reactant solution, in the condition of a dryice/acetone bath. After the reaction mixture was stirred overnight at room temperature, a reddish slurry was obtained. In a glove box, 3.50 g (9.27 mmol) of $ZrCl_4(THF)_2$ was prepared to make a solution with 50 mL of toluene, followed by adding the ligand-Li solution prepared above dropwise thereto, in the condition of a dryice/acetone bath. After the overnight reaction at room temperature, a reddish slurry was obtained as a reaction product. After filtering the reaction product to remove LiCl, about 90% of toluene was removed by a vacuum drying, and then recrystallized with hexane. The resultant slurry was filtered to obtain 2.5 g (4.1 mmol) of a metallocene compound as a yellow filtered cake (yield 44.1%).

$^1H$ NMR (500 MHz, $CDCl_3$, ppm): δ 0.93 (3H, s), 1.17 (12H, s), 1.37-1.63 (8H, m), 2.81-2.87 (1H, m), 2.93-2.97 (1H, m), 3.29-3.31 (2H, t), 5.55 (1H, s), 7.02-7.57 (4H, m).

Comparative Synthesis Example 1: Preparation of the First Metallocene Compound

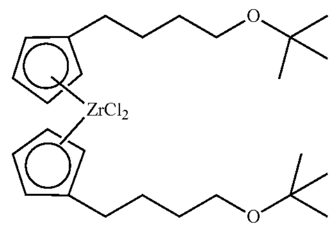

t-Butyl-O—$(CH_2)_6$—Cl was prepared by the method shown in Tetrahedron Lett. 2951 (1988) using 6-chlorohexanol, and reacted with cyclopentadienyl sodium (sodium Cp salt, NaCp) to obtain t-butyl-O—$(CH_2)_6$—$C_5H_5$ (yield 60%, b.p. 80° C./0.1 mmHg).

Further, t-butyl-O—$(CH_2)_6$—$C_5H_5$ was dissolved in THF at −78° C., and n-BuLi was slowly added thereto. Thereafter, it was heated to room temperature and reacted for 8 hours. The lithium salt solution synthesized as described above was slowly added to a suspension solution of $ZrCl_4(THF)_2$ (170 g, 4.50 mmol)/THF (30 mL) at −78° C., and further reacted for about 6 hours at room temperature. All volatiles were dried in vacuum and the resulting oily liquid material was filtered by adding a hexane solvent. The filtered solution was dried in vacuum, and hexane was added to obtain a precipitate at a low temperature (−20° C.). The obtained precipitate was filtered at a low temperature to obtain [tBu-O—$(CH_2)_6$—$C_5H_4]_2ZrCl_2$ in the form of a white solid (yield 92%).

$^1H$-NMR (300 MHz, $CDCl_3$, ppm): δ 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}C$-NMR (300 MHz, $CDCl_3$, ppm): δ 135.09, 116.66, 112.28, 72.42, 61.52, 30.66, 30.31, 30.14, 29.18, 27.58, 26.00.

Synthesis Example 3: Preparation of the Second Metallocene Compound

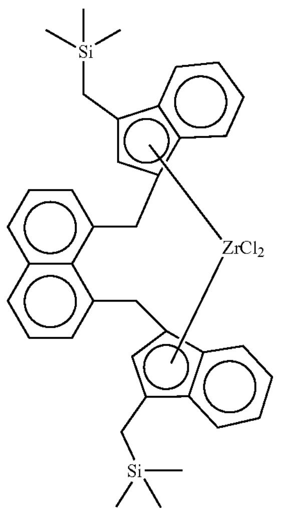

After dissolving 6.3 g (20 mmol) of 1,8-bis(bromomethyl)naphthalene and 8.3 g (40 mmol) of the lithium salt of methyl trimethylsilyl-indene (methyl TMS-Indene Lithium salt) in 80 mL of THF, respectively, one of the the solutions was added dropwise to the other solution in a dryice/acetone bath, and then stirred at room temperature overnight. After the stirring was completed, the reaction product was extracted with diethyl ether/water (ether/water) and treated with $MgSO_4$ to remove residual moisture in the organic layer. Thereafter, the solvent was removed under reduced pressure (vacuum) to obtain 11.1 g (20 mmol, Mw 556.93) of the liquid ligand compound.

11 g of the obtained ligand compound was dissolved in a mixed solvent of 80 mL of toluene and 5 mL of methyl tert-butyl ether (MTBE). To the prepared solution, 16.7 mL (41.6 mmol) of a 2.5 M n-butyl lithium hexane solution was added dropwise and stirred at room temperature. In addition, 7.5 g (19.8 mmol) of $ZrCl_4(THF)_2$ was added to 80 mL of toluene to prepare a slurry, and then transferred into the reaction mixture in a dry ice/acetone bath, followed by stirring at room temperature overnight.

After the stirring was completed, the slurry was filtered to remove LiCl, and toluene of the filtrate was removed by vacuum drying. Then, 100 mL of hexane was added thereto, followed by sonication for 1 hour. Thereafter, the acquired slurry was filtered to obtain 4.5 g (yield 62.3 mol %, yellow solid) of a metallocene compound as a filtered solid.

$^1H$ NMR (500 MHz, $CDCl_3$, ppm): δ 8.16-6.95 (14H, m), 5.99 (2H, d), 3.99 (2H, m), 3.83 (2H, m), 3.39 (2H, m), 0.15 (18H, d).

Comparative Synthesis Example 2: Preparation of the Second Metallocene Compound

Preparation of $tBu\text{-}O—(CH_2)_6)(CH_3)Si(C_5(CH_3)_4)(tBu\text{-}N)TiCl_2$ 50 g of Mg was added to a 10 L reactor at room temperature, followed by 300 mL of THF. 0.5 g of 12 was added, and the reactor temperature was maintained at 50° C. After the reactor temperature was stabilized, 250 g of 6-t-butoxyhexyl chloride was added to the reactor at a rate of 5 mL/min using a feeding pump. It was observed that the reactor temperature rose by 4° C. to 5° C. with the addition of 6-t-butoxyhexylchloride. It was stirred for 12 hours while continuously adding 6-t-butoxyhexylchloride to obtain a black reaction solution. 2 mL of the black solution was taken to which water was added to obtain an organic layer. The organic layer was confirmed to be 6-t-butoxyhexane through $^1H$-NMR. From 6-t-butoxyhexane prepared above, it was confirmed that Grignard reaction was well performed. Consequently, 6-t-butoxyhexyl magnesium chloride was synthesized.

500 g of trichloromethylsilane ($MeSiCl_3$) and 1 L of THF were introduced to a reactor, and then the reactor temperature was cooled down to −20° C. 560 g of the 6-t-butoxyhexyl magnesium chloride synthesized above was added to the reactor at a rate of 5 mL/min using a feeding pump. After completion of the feeding of Grignard reagent, the mixture was stirred for 12 hours while slowly raising the reactor temperature to room temperature. Then, it was confirmed that white $MgCl_2$ salt was produced. 4 L of hexane was added thereto and the salt was removed through a labdori to obtain a filtered solution. After the filtered solution was added to the reactor, hexane was removed at 70° C. to obtain a pale yellow liquid. The obtained liquid was confirmed to be methyl(6-t-butoxyhexyl)dichlorosilane through $^1H$-NMR $^1H$-NMR ($CDCl_3$, ppm): δ 3.3 (t, 2H), 1.5 (m, 3H), 1.3 (m, 5H), 1.2 (s, 9H), 1.1 (m, 2H), 0.7 (s, 3H).

1.2 mol (150 g) of tetramethylcyclopentadiene and 2.4 L of THF were added to the reactor, and then the reactor temperature was cooled down to −20° C. 480 mL of n-BuLi was added to the reactor at a rate of 5 mL/min using a feeding pump. After n-BuLi was added, the mixture was stirred for 12 hours while slowly raising the reactor temperature to room temperature. Then, an equivalent of methyl (6-t-butoxyhexyl)dichlorosilane (326 g, 350 mL) was rapidly added to the reactor. The mixture was stirred for 12 hours while slowly raising the reactor temperature to room temperature. Then, the reactor temperature was cooled to 0° C. again, and 2 equivalents of $t\text{-}BuNH_2$ was added. The mixture was stirred for 12 hours while slowly raising the reactor temperature to room temperature. Then, THF was removed. Thereafter, 4 L of hexane was added and the salt was removed through a labdori to obtain a filtered solution. The filtered solution was added to the reactor again, and hexane was removed at 70° C. to obtain a yellow solution. The yellow solution obtained above was confirmed to be methyl(6-t-butoxyhexyl)(tetramethylcyclopentadienyl)t-butylaminosilane through $^1H$-NMR.

$TiCl_3(THF)_3$ (10 mmol) was rapidly added to a dilithium salt of a ligand at −78° C., which was synthesized from n-BuLi and the ligand of dimethyl(tetramethylcyclopentadienyl)t-butylaminosilane in THF solution. While slowly heating the reaction solution from −78 degrees of Celsius (° C.) to room temperature, it was stirred for 12 hours. Then, an equivalent of $PbCl_2$ (10 mmol) was added to the reaction solution at room temperature, and then stirred for 12 hours to obtain a dark black solution having a blue color. After removing THF from the resulting reaction solution, hexane was added to filter the product. Hexane was removed from the filtered solution, and then the product was confirmed to be the desired methyl(6-t-butoxyhexyl)silyl(η5-tetramethylcyclopentadienyl)(t-butylamido)] titanium dichloride, $tBu\text{-}O—(CH_2)_6(CH_3)Si(C_5(CH_3)_4)(tBu\text{-}N)TiCl_2$ through $^1H$-NMR.

$^1H$-NMR (300 MHz, $CDCl_3$, ppm): δ 3.3 (s, 4H), 2.2 (s, 6H), 2.1 (s, 6H), 1.8-0.8 (m), 1.4 (s, 9H), 1.2 (s, 9H), 0.7 (s, 3H).

Preparation of Supported Catalyst

Preparation Example 1: Preparation of Supported Catalyst 5.0 kg of toluene solution was added to a 20 L stainless steel (sus) high pressure reactor, and the reactor temperature was maintained at 40° C. After adding 1 kg of silica (SP948, manufactured by Grace Davison Co.) dehydrated at a temperature of 600° C. for 12 hours under vacuum to the reactor and dispersing the silica sufficiently, 109.75 g of the metallocene compound of Synthesis Example 1 was dissolved in toluene, added thereto and then reacted while stirring at 200 rpm at 40° C. for 2 hours. Thereafter, the stirring was stopped, followed by settling for 30 minutes and then decantation of the reaction solution.

2.5 kg of toluene was added to the reactor, and 9.4 kg of 10 wt % methylaluminoxane (MAO)/toluene solution was added thereto, followed by stirring at 200 rpm at 40° C. for 12 hours. Thereafter, the stirring was stopped, followed by settling for 30 minutes and then decantation of the reaction solution. After 3.0 kg of toluene was added and stirred for 10 minutes, the stirring was stopped, followed by settling for 30 minutes and then decantation of the toluene solution.

After 3.0 kg of toluene was added to the reactor, 358.58 g of the metallocene compound of Synthesis Example 3 was dissolved in 1 L of the toluene solution, and added thereto, followed by stirring at 200 rpm at 40° C. for 2 hours. At this time, the ratio of the metallocene compound of Synthesis Example 1 and the metallocene compound of Synthesis Example 3 was 4:10 in a molar ratio. After lowering the reactor temperature to room temperature, the stirring was stopped, followed by settling for 30 minutes and then decantation of the reaction solution.

2.0 kg of toluene was added to the reactor and stirred for 10 minutes. Then, the stirring was stopped, followed by settling for 30 minutes and then decantation of the reaction solution.

3.0 kg of hexane was added to the reactor, the hexane slurry was transferred to a filter drier, and the hexane solution was filtered. 910 g-$SiO_2$ supported hybrid catalyst was prepared by drying under reduced pressure at 40° C. for 4 hours.

Preparation Example 2: Preparation of Supported Catalyst

A supported hybrid catalyst was prepared in the same manner as in Preparation Example 1, except that the ratio of the metallocene compound of Synthesis Example 1 and the metallocene compound of Synthesis Example 3 was 5:10 in a molar ratio.

Preparation Example 3: Preparation of Supported Catalyst

A supported hybrid catalyst was prepared in the same manner as in Preparation Example 1, except that the metallocene compound of Synthesis Example 2 to the metallocene compound of Synthesis Example 3 were added in a molar ratio of 5:10.

Comparative Preparation Example 1: Preparation of Supported Catalyst

A supported hybrid catalyst was prepared in the same manner as in Preparation Example 1, except that the metallocene compounds of Comparative Synthesis Examples 1 and 2 were used instead of the metallocene compounds of Synthesis Examples 1 and 3, respectively, and the metallocene compound of Comparative Synthesis Example 1 and the metallocene compound of Comparative Synthesis Example 2 were added in a molar ratio of 3:10.

Comparative Preparation Example 2: Preparation of Supported Catalyst

A supported hybrid catalyst was prepared in the same manner as in Comparative Preparation Example 1, except that the ratio of the metallocene compound of Comparative Synthesis Example 1 and the metallocene compound of Comparative Synthesis Example 2 was 4:10 in a molar ratio.

Comparative Preparation Example 3: Preparation of Supported Catalyst

A supported hybrid catalyst was prepared in the same manner as in Comparative Preparation Example 1, except that the ratio of the metallocene compound of Comparative Synthesis Example 1 and the metallocene compound of Comparative Synthesis Example 2 was 5:8 in a molar ratio.

Comparative Preparation Example 4: Preparation of Supported Catalyst

A supported hybrid catalyst was prepared in the same manner as in Preparation Example 1, except that the ratio of the metallocene compound of Synthesis Example 1 and the metallocene compound of Synthesis Example 3 was 2:10 in a molar ratio.

Preparation of Polyethylene

Example 1-1

The supported catalyst prepared in Preparation Example 1 was added to a single slurry polymerization process to prepare a high density polyethylene, which is an ethylene homopolymer.

First, a 100 $m^3$ reactor was charged with a flow rate of 25 ton/hr of hexane, 10 ton/hr of ethylene, 15 $m^3$/hr of hydrogen, and 10 kg/hr of triethylaluminum (TEAL), and a supported hybrid metallocene catalyst of Preparation Example 1 was injected to the reactor in 0.5 kg/hr. Here, the input amount of the hydrogen gas was 52 ppm based on the ethylene content. Thereafter, the ethylene was continuously reacted in a hexane slurry state at a reactor temperature of 82° C. and a pressure of 7.0 kg/$cm^2$ to 7.5 kg/$cm^2$. Then, it was subjected to solvent removal and drying to prepare a high density polyethylene (HDPE, Homo PE) in a powder form.

Example 1-2

High density polyethylene of Example 1-2 having a powder form was prepared in the same manner as in Example 1-1, except that the supported catalyst prepared in Preparation Example 2 was used instead of the supported catalyst prepared in Preparation Example 1, and the input amount of hydrogen was changed to 97 ppm.

Example 1-3

High density polyethylene of Example 1-3 having a powder form was prepared in the same manner as in Example 1-1, except that the supported catalyst prepared in Preparation Example 2 was used instead of the supported catalyst prepared in Preparation Example 1, and the input amount of hydrogen was changed to 144 ppm.

Example 1-4

High density polyethylene of Example 1-4 having a powder form were prepared in the same manner as in Example 1-1, except that the supported catalyst prepared in Preparation Example 3 was used instead of the supported catalyst prepared in Preparation Example 1, and the input amount of hydrogen was changed to 85 ppm.

Comparative Example 1-1

A high density polyethylene (HDPE) commercial product (CE6040K, manufactured by LG Chem), which is prepared using a Ziegler-Natta catalyst (Z/N-1) and has a melt index ($MI_5$, 190° C., 5 kg) of 0.46 g/10 min, was prepared for Comparative Example 1-1.

Comparative Example 1-2

A high density polyethylene (HDPE) commercial product (CE6040X, manufactured by LG Chem), which is prepared using a Ziegler-Natta catalyst (Z/N-2) and has a melt index ($MI_5$, 190° C., 5 kg) of 0.98 g/10 min, was prepared for Comparative Example 1-2.

Comparative Example 1-3

A high density polyethylene (HDPE) commercial product (CE2080, manufactured by LG Chem), which is prepared using a Ziegler-Natta catalyst (Z/N-3) and has a melt index ($MI_5$, 190° C., 5 kg) of 1.28 g/10 min, was prepared for Comparative Example 1-3.

Comparative Examples 1-4 and 1-5

High density polyethylenes of Comparative Examples 1-4 and 1-5 having a powder form were prepared in the same manner as in Example 1-1, except that each of the supported catalysts prepared in Comparative Preparation Example 1 and 2 was used instead of the supported catalyst prepared in Preparation Example 1, respectively, and the input amount of hydrogen was changed to 3 ppm and 18 ppm, respectively.

Comparative Examples 1-6 and 1-7

High density polyethylenes of Comparative Examples 1-6 and 1-7 having a powder form were prepared in the same manner as in Example 1-1, except that the supported catalysts prepared in Comparative Preparation Example 3 was used instead of the supported catalyst prepared in Preparation Example 1, and the input amount of hydrogen was changed to 18 ppm and 3 ppm, respectively.

Comparative Example 1-8

High density polyethylenes of Comparative Example 1-8 having a powder form was prepared in the same manner as in Example 1-1, except that the supported catalysts prepared in Comparative Preparation Example 4 was used instead of the supported catalyst prepared in Preparation Example 1, and the input amount of hydrogen was changed to 30 ppm.

Test Example 1

Physical properties of the polyethylenes prepared in Examples 1-1 to 1-4 and Comparative Examples 1-1 to 1-8 were measured by the following method, and the results are shown in Table 1 below.

1) Melt Index (MI, g/10 min)

The melt index ($MI_5$, $MI_{21.6}$) was measured under a load of 5 kg, and 21.6 kg, respectively, in accordance with ASTM D 1238 at a temperature of 190° C. A weight (g) of polymer melted for 10 minutes was recorded as the melt index.

2) Melt Flow Rate Ratio (MFRR)

The melt flow rate ratio (MFRR, $MI_{21.6/5}$) was obtained by dividing the melt index measured at 190° C. under a load of 21.6 kg by the melt index measured at 190° C. under a load of 5 kg in accordance with ASTM D 1238.

3) Density

The density (g/$cm^3$) was measured in accordance with ASTM D 1505.

4) Complex Viscosity According to Frequency

The complex viscosity for each polyethylene of Examples 1 to 2 and Comparative Examples 1 to 5 was measured using a rotary rheometer (ARES Rheometer) at 190° C. and a frequency (ω) of 0.05 rad/s to 500 rad/s.

In detail, the complex viscosity of each polyethylene was determined by measuring complex viscosity η*(ω0.05) and η*(ω500) according to frequency using a rotary rheometer ARES (Advanced Rheometric Expansion System, ARES G2) of TA instruments (New Castle, Delaware). A predetermined amount of the polyethylene sample was injected into the instrument, and the gap between parallel plates with a diameter of 25.0 mm became 2.0 mm at 190° C. Measurements were conducted in a dynamic strain frequency sweep mode and at a strain rate of 5% and a frequency (angular frequency) of 0.05 rad/s to 500 rad/s. 10 points for each decade, a total of 41 points, were measured. Among them, each of the complex viscosity measured at a frequency (ω) of 0.05 rad/s and 500 rad/s was shown in Table 1 below.

TABLE 1

| | Catalyst | $H_2$ Input (ppm) | Polymer | $MI_5$ (5 kg, 190° C., g/10 min) | $MI_{21.6}$ (21.6 kg, 190° C., g/10분) | MFRR (21.6/5) | Density (g/$cm^3$) | η* (ω0.05, Pa · s) | η* (ω0.05, Pa · s) |
|---|---|---|---|---|---|---|---|---|---|
| Example 1-1 | Preparation Example 1 | 52 | Homo PE | 0.21 | 2.84 | 13.52 | 0.950 | 113620 | 1480 |
| Example 1-2 | Preparation Example 2 | 97 | Homo PE | 0.27 | 3.54 | 13.11 | 0.951 | 94970 | 1390 |
| Example 1-3 | Preparation Example 2 | 144 | Homo PE | 0.35 | 5.32 | 15.20 | 0.950 | 79920 | 1070 |
| Example 1-4 | Preparation Example 3 | 85 | Homo PE | 0.28 | 3.90 | 13.93 | 0.951 | 90540 | 1360 |
| Comparative Example 1-1 | Z/N-1 | — | Homo PE | 0.46 | 4.74 | 10.30 | 0.951 | 65290 | 1410 |
| Comparative Example 1-2 | Z/N-2 | — | Homo PE | 0.98 | 9.70 | 9.90 | 0.953 | 55140 | 1120 |

TABLE 1-continued

| | Catalyst | $H_2$ Input (ppm) | Polymer | $MI_5$ (5 kg, 190° C., g/10 min) | $MI_{21.6}$ (21.6 kg, 190° C., g/10분) | MFRR (21.6/5) | Density (g/cm$^3$) | η* (ω0.05, Pa · s) | η* (ω0.05, Pa · s) |
|---|---|---|---|---|---|---|---|---|---|
| Comparative Example 1-3 | Z/N-3 | — | Homo PE | 1.28 | 19.33 | 15.10 | 0.958 | 39160 | 680 |
| Comparative Example 1-4 | Comparative Preparation Example 1 | 3 | Homo PE | 0.63 | 6.68 | 10.60 | 0.951 | 61210 | 1410 |
| Comparative Example 1-5 | Comparative Preparation Example 2 | 18 | Homo PE | 0.84 | 8.99 | 10.70 | 0.951 | 57890 | 1340 |
| Comparative Example 1-6 | Comparative Preparation Example 3 | 18 | Homo PE | 1.60 | 13.44 | 8.40 | 0.951 | 28700 | 1075 |
| Comparative Example 1-7 | Comparative Preparation Example 3 | 3 | Homo PE | 0.98 | 9.70 | 9.90 | 0.95 | 40980 | 1310 |
| Comparative Example 1-8 | Comparative Preparation Example 4 | 30 | Homo PE | 0.18 | 2.14 | 11.89 | 0.951 | 134450 | 1800 |

As shown in Table 1, it was confirmed that Examples had the melt index and density in the optimized ranges, as well as the complex viscosity at the frequencies of 0.05 rad/s and 500 rad/s in the preferred ranges, compared to Comparative Examples.

Test Example 2

Chlorinated polyethylenes of Examples 2-1 to 2-4 and Comparative Examples 2-1 to 2-8 were prepared using the polyethylenes prepared in Examples 1-1 to 1-4 and Comparative Examples 1-1 to 1-8.

Preparation of Chlorinated Polyethylene

5000 L of water and 550 kg of the high density polyethylene prepared in Example 1-1 were added to a reactor, followed by sodium polymethacrylate as a dispersant, oxypropylene and oxyethylene copolyether as an emulsifier, and benzoyl peroxide as a catalyst. Then, the temperature was raised from 80° C. to 132° C. at a rate of 17.3° C./hr and chlorination was carried out by injecting gaseous chlorine at a final temperature of 132° C. for 3 hours. In the chlorination reaction, the gaseous chlorine was injected while simultaneously raising the temperature and maintaining the reactor pressure at 0.3 MPa, and a total input of chlorine was 700 kg. The chlorinated reactant was neutralized with NaOH for 4 hours, washed again with running water for 4 hours, and finally dried at 120° C. to prepare a chlorinated polyethylene in a powder form.

In addition, chlorinated polyethylenes having a powder form were also prepared in the same manner as described above, using the polyethylenes prepared in Examples 1-2 to 1-4 and Comparative Examples 1-1 to 1-8.

As described above, physical properties of the chlorinated polyethylenes of Examples 2-1 to 2-4 and Comparative Examples 2-1 to 2-8 prepared using the polyethylenes of Examples 1-1 to 1-4 and Comparative Examples 1-1 to 1-8 were measured by the following method, and the results are shown in Table 2 below.

1) MV (Mooney Viscosity) of CPE

Wrap a rotor in a Mooney viscometer with a CPE sample and close a die. After preheating to 121° C. for 1 min, the rotor was rotated for 4 min to measure MV (Mooney viscosity, 121° C., ML1+4). Here, the unit for mooney viscosity is a Mooney Unit (MU), and the unit for mooney viscosity is not usually indicated. However, if conversion is required, one Mooney Unit (MU) may be 0.083 Nm.

2) Drying Time of CPE (Min)

After preparing chlorinated polyethylene (CPE) by reacting chlorine under conditions of about 60° C. to about 150° C. in a slurry state (with water or HCl aqueous solution) the prepared CPE was added to NaOH to neutralize for 4 hours, and washed again with running water for 4 hours. Then, it was finally dried at 120° C. to prepare a final product of chlorinated polyethylene in powder form. Here, drying was carried out until the moisture content of the final product became 0.4 wt % or less, and the time taken at this time was measured in minutes and expressed as drying time (min).

TABLE 2

| | Examples | | | | Comparative Examples | | | | | | | |
|---|---|---|---|---|---|---|---|---|---|---|---|---|
| | 2-1 | 2-2 | 2-3 | 2-4 | 2-1 | 2-2 | 2-3 | 2-4 | 2-5 | 2-6 | 2-7 | 2-8 |
| MV of CPE (121° C., ML1 + 4) | 100 | 95 | 90 | 95 | 100 | 90 | 70 | 100 | 95 | 90 | 95 | 125 |
| Drying time (min) | 115 | 125 | 155 | 140 | 200 | 220 | 270 | 200 | 205 | 320 | 250 | 115 |

As shown in Table 2, the Examples facilitated the deoxidation, dehydration, and drying processes during chlorination, and performed the chlorination process at the increasing reaction temperature, and then achieved the improved CPE productivity, while securing the Mooney viscosity after chlorination with the optimum range, compared to Comparative Examples.

The invention claimed is:

1. A polyethylene having:

a $MI_5$ (a melt index measured at 190° C. under a load of 5 kg) of 0.55 g/10 min or less, a $MI_{21.6}$ (a melt index measured at 190° C. under a load of 21.6 kg) of 6 g/10 min or less, a complex viscosity ($\eta^*(\omega 0.05)$) of 68000 Pa·s or more, measured at a frequency($\omega$) of 0.05 rad/s, and a complex viscosity ($\eta^*(\omega 500)$) of 900 Pa·s to 1600 Pa·s, measured at a frequency($\omega$) of 500 rad/s, wherein the polyethylene is an ethylene homopolymer.

2. The polyethylene of claim 1, wherein the $MI_5$ (a melt index measured at 190° C. under a load of 5 kg) is 0.1 g/10 min to 0.55 g/10 min.

3. The polyethylene of claim 1, wherein the $MI_{21.6}$ (a melt index measured at 190° C. under a load of 21.6 kg) is 2.2 g/10 min to 6 g/10 min.

4. The polyethylene of claim 1, which has a melt flow rate ratio ($MFRR_{21.6/5}$, a value obtained by dividing the melt index measured at 190° C. under a load of 21.6 kg by the melt index measured at 190° C. under a load of 5 kg in accordance with ASTM D 1238) of 10 to 18.

5. The polyethylene of claim 1, wherein the complex viscosity ($\eta^*(\omega 0.05)$) is 68000 Pa·s to 180000 Pa·s, measured at a frequency($\omega$) of 0.05 rad/s.

6. The polyethylene of claim 1, which has a density of 0.947 $g/cm^3$ or more.

7. A method for preparing the polyethylene according to claim 1, comprising the step of polymerizing ethylene in the presence of at least one first metallocene compound represented by the following Chemical Formula 1; and at least one second metallocene compound selected from the compounds represented by the following Chemical Formula 2, wherein the molar ratio of the first metallocene compound and the second metallocene compound is 2.5:10 to 7:10:

[Chemical Formula 1]

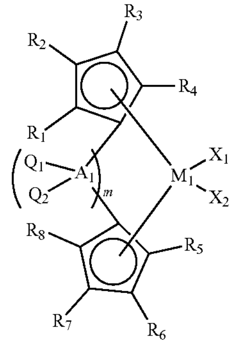

In Chemical Formula 1, at least one of $R_1$ to $R_8$ is $-(CH_2)_n-OR$, wherein R is $C_{1-6}$ linear or branched alkyl and n is an integer of 2 to 4;

the rest of $R_1$ to $R_8$ are the same as or different from each other, and are each independently selected from the group consisting of hydrogen, halogen, $C_{1-20}$ linear or branched alkyl, $C_{2-20}$ linear or branched alkenyl, $C_{6-20}$ aryl, $C_{7-40}$ alkylaryl, and $C_{7-40}$ arylalkyl, or two or more of $R_1$ to $R_4$ or two or more of $R_5$ to $R_8$ that are adjacent to each other are connected with each other to form a $C_{6-20}$ aliphatic or aromatic ring unsubstituted or substituted with a $C_{1-10}$ hydrocarbyl group;

$Q_1$ and $Q_2$ are the same as or different from each other, and are each independently hydrogen, halogen, $C_{1-20}$ linear or branched alkyl, $C_{2-20}$ linear or branched alkenyl, $C_{2-20}$ linear or branched alkoxyalkyl, $C_{6-20}$ aryl, $C_{7-40}$ alkylaryl, or $C_{7-40}$ arylalkyl;

$A_1$ is carbon, silicon, or germanium;

$M_1$ is a Group 4 transition metal;

$X_1$ and $X_2$ are the same as or different from each other, and are each independently halogen, $C_{1-20}$ linear or branched alkyl, $C_{2-20}$ linear or branched alkenyl, $C_{6-20}$ aryl, a nitro group, an amido group, $C_{1-20}$ alkylsilyl, $C_{1-20}$ linear or branched alkoxy, or a $C_{1-20}$ sulfonate group; and m is an integer of 0 or 1,

[Chemical Formula 2]

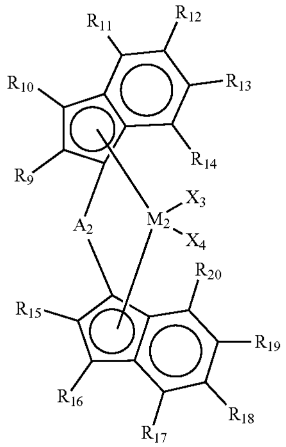

In Chemical Formula 2, $A_2$ is $C_{4-20}$ alkylene, $C_{4-20}$ alkenylene, $C_{6-20}$ arylene, $C_{4-20}$ cycloalkylene, $C_{7-22}$ arylalkylene, or $C_{5-22}$ cycloalkylalkylene;

$R_9$, $R_{10}$, $R_{15}$, and $R_{16}$ are the same as or different from each other, and are each independently $C_{1-20}$ silylalkyl, $C_{1-20}$ alkoxysilyl, $C_{1-20}$ linear or branched alkoxy, $C_{6-20}$ aryl, $C_{7-40}$ alkylaryl, or $C_{7-40}$ arylalkyl;

$R_{11}$ to $R_{14}$ and $R_{17}$ to $R_{20}$ are the same as or different from each other, and are each independently hydrogen, halogen, $C_{1-20}$ linear or branched alkyl, $C_{2-20}$ linear or branched alkenyl, $C_{1-20}$ alkylsilyl, $C_{1-20}$ silylalkyl, $C_{1-20}$ alkoxysilyl, $C_{1-20}$ linear or branched alkoxy, $C_{6-20}$ aryl, $C_{7-40}$ alkylaryl, or $C_{7-40}$ arylalkyl, or two or more of $R_1$ to $R_{14}$ or two or more of $R_{17}$ to $R_{20}$ that are adjacent to each other are connected with each other to form a $C_{6-20}$ aliphatic or aromatic ring unsubstituted or substituted with a $C_{1-10}$ hydrocarbyl group;

$M_2$ is a Group 4 transition metal; and $X_3$ and $X_4$ are the same as or different from each other, and are each independently halogen, $C_{1-20}$ linear or branched alkyl, $C_{2-20}$ linear or branched alkenyl, $C_{6-20}$ aryl, a nitro group, an amido group, $C_{1-20}$ alkylsilyl, $C_{1-20}$ linear or branched alkoxy, or a $C_{1-20}$ sulfonate group.

8. The method for preparing the polyethylene according to claim 7, wherein the first metallocene compound is represented by one of the following Chemical Formulae 1-1 to 1-6:

[Chemical Formula 1-1]

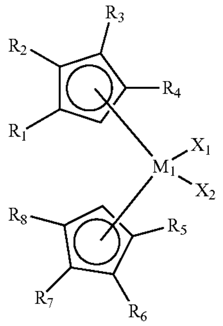

[Chemical Formula 1-2]

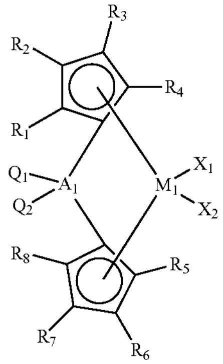

-continued

[Chemical Formula 1-3]

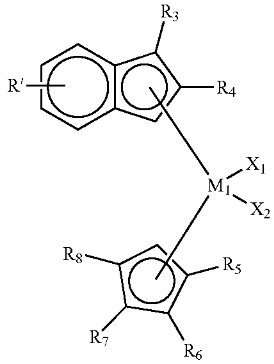

[Chemical Formula 1-4]

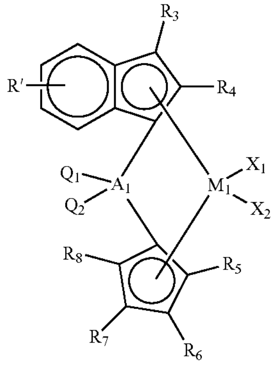

[Chemical Formula 1-5]

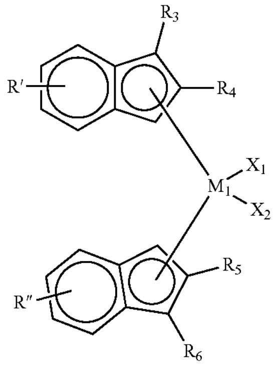

[Chemical Formula 1-6]

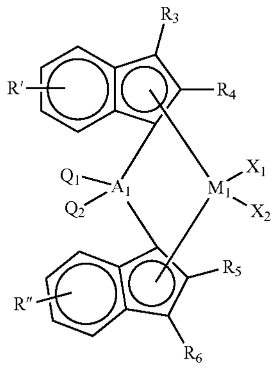

in Chemical Formulae 1-1 to 1-6, $Q_1$, $Q_2$, $A_1$, $M_1$, $X_1$, $X_2$, and $R_1$ to $R_8$ are the same as defined in claim 7, and R' and R" are the same as or different from each other, and are each independently hydrogen or a $C_{1-10}$ hydrocarbyl group.

9. The method for preparing the polyethylene according to claim 7, wherein the second metallocene compound is represented by one of the following Chemical Formulae 2-1 or 2-2:

[Chemical Formula 2-1]

[Chemical Formula 2-1]

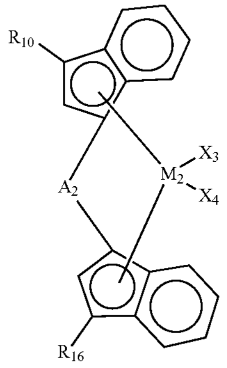

[Chemical Formula 2-2]

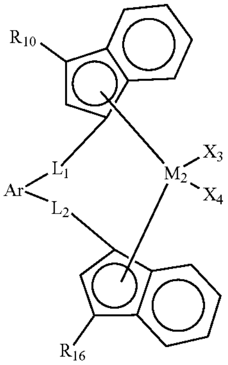

in Chemical Formulae 2-1 and 2-2, $M_2$, $X_3$, $X_4$, $R_{10}$, and $R_{16}$ are the same as defined in claim 8, Ar are the same as or different from each other, and are each independently $C_{6-20}$ arylene, and $L_1$ and $L_2$ are the same as or different from each other, and are each independently $C_{1-4}$ alkylene.

10. The method for preparing the polyethylene according to claim 7, wherein $R_{10}$ and $R_{16}$ are each independently $C_{1-20}$ alkylsilyl, or $C_{1-20}$ silylalkyl.

11. The method for preparing the polyethylene according to claim 7, wherein the polymerization is carried out while introducing 35 ppm or more to 200 ppm or less of hydrogen gas based on the ethylene content.

12. A chlorinated polyethylene prepared by reacting the polyethylene of claim 1 with chlorine.

13. The chlorinated polyethylene according to claim 12, wherein the chlorinated polyethylene has a Mooney viscosity (MV) measured at 121° C. of 90 or more to 100 or less.

14. A PVC composition, comprising the chlorinated polyethylene according to claim 12 and polyvinyl chloride (PVC).

15. The method for preparing the polyethylene according to claim 7, wherein $R_3$ and $R_6$ are the same as or different from each other, and each independently an unsubstituted $C_{1-6}$ alkyl or $C_{2-6}$ alkyl substituted with $C_{1-6}$ alkoxy.

16. The method for preparing the polyethylene according to claim 7, wherein the first metallocene compound is represented by any one of the following structural formulas:

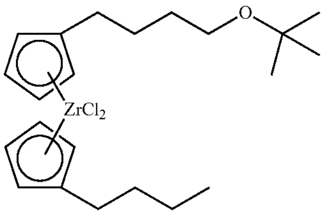

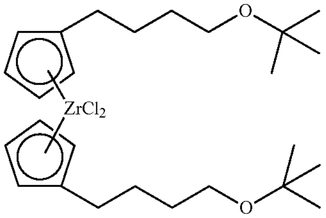

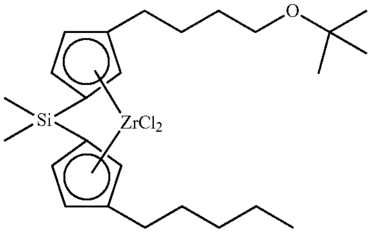

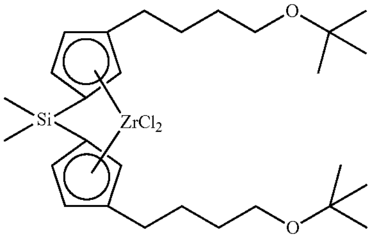

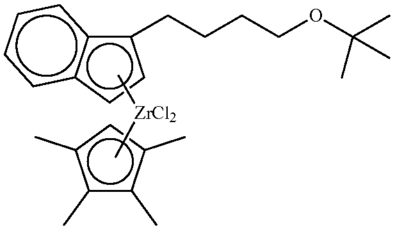

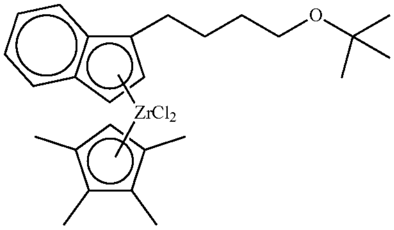

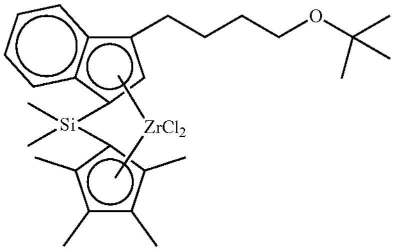

-continued
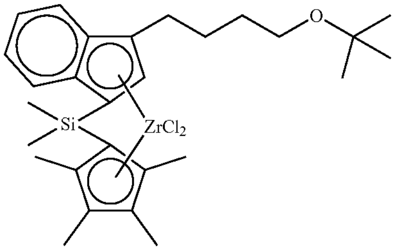
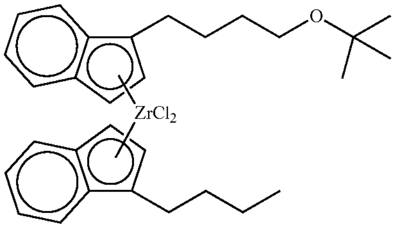
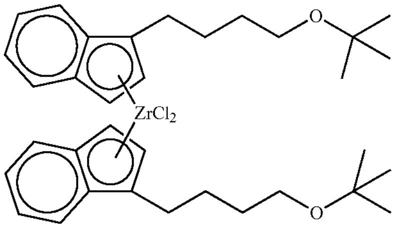
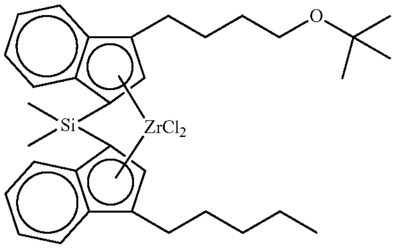
-continued
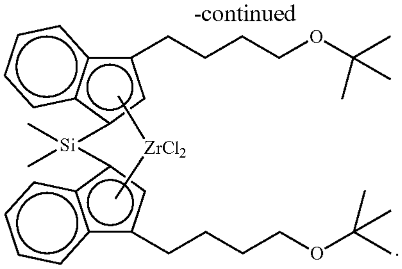
17. The method for preparing the polyethylene according to claim 7, wherein the second metallocene compound is represented by the following structural formula:
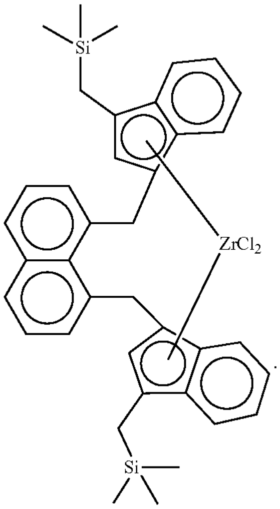
* * * * *